(12) United States Patent
Zhang et al.

(10) Patent No.: US 11,876,971 B2
(45) Date of Patent: *Jan. 16, 2024

(54) INTERACTIONS AMONG MULTIPLE INTRA CODING METHODS

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/895,490

(22) Filed: Aug. 25, 2022

(65) Prior Publication Data

US 2023/0096273 A1   Mar. 30, 2023

Related U.S. Application Data

(63) Continuation of application No. 17/502,258, filed on Oct. 15, 2021, now Pat. No. 11,509,904, which is a (Continued)

(30) Foreign Application Priority Data

May 11, 2019  (WO) ................ PCT/CN2019/086489

(51) Int. Cl.
*H04N 19/105*  (2014.01)
*H04N 19/159*  (2014.01)
(Continued)

(52) U.S. Cl.
CPC ......... *H04N 19/132* (2014.11); *H04N 19/105* (2014.11); *H04N 19/159* (2014.11); *H04N 19/176* (2014.11)

(58) Field of Classification Search
CPC .......................... H04N 19/132; H04N 19/105
See application file for complete search history.

(56) References Cited

U.S. PATENT DOCUMENTS 8,275,051 B2  9/2012  Hannuksela et al.
9,369,708 B2  6/2016  Zhang et al.
(Continued)

FOREIGN PATENT DOCUMENTS

CN    1547854 A    11/2004
CN    102075763 A   5/2011
(Continued)

OTHER PUBLICATIONS

Bross et al. "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, document JVET-N1001, 2019.

(Continued)

*Primary Examiner* — Irfan Habib
(74) *Attorney, Agent, or Firm* — Conley Rose, P.C.

(57) ABSTRACT

A video processing method includes determining, for a conversion between a block of a video and a bitstream representation of the video, a manner in which information for a Matrix-based Intra Prediction (MIP) coding technique is coded in the bitstream representation. A prediction block of the block is determined using the MIP coding technique based on performing a matrix vector multiplication operation on previously coded samples of the video. The method also includes performing the conversion based on the determining.

20 Claims, 31 Drawing Sheets

Related U.S. Application Data continuation of application No. PCT/CN2020/089559, filed on May 11, 2020.

(51) Int. Cl.
  *H04N 19/132* (2014.01)
  *H04N 19/176* (2014.01)

(56) References Cited

U.S. PATENT DOCUMENTS

| | | | |
|---|---|---|---|
| 9,516,306 | B2 | 12/2016 | Zhang et al. |
| 9,525,861 | B2 | 12/2016 | Zhang et al. |
| 9,615,090 | B2 | 4/2017 | Zhang et al. |
| 10,462,462 | B2* | 10/2019 | Chien ............... H04N 19/13 |
| 10,701,366 | B2* | 6/2020 | Chen ............... H04N 19/139 |
| 11,064,206 | B2* | 7/2021 | Zhang ............... H04N 19/172 |
| 2009/0196344 | A1* | 8/2009 | Brown ............... H04N 19/513 375/E7.126 |
| 2012/0082391 | A1 | 4/2012 | Fernandes |
| 2014/0044180 | A1 | 2/2014 | Chen |
| 2014/0105283 | A1 | 4/2014 | Li et al. |
| 2014/0198179 | A1 | 7/2014 | Gu et al. |
| 2015/0326880 | A1 | 11/2015 | He et al. |
| 2016/0100189 | A1 | 4/2016 | Pang |
| 2016/0182913 | A1 | 6/2016 | Joshi et al. |
| 2018/0014017 | A1 | 1/2018 | Li et al. |
| 2018/0098066 | A1* | 4/2018 | Lee ............... H04N 19/523 |
| 2018/0192072 | A1* | 7/2018 | Chen ............... H04N 19/159 |
| 2018/0241998 | A1* | 8/2018 | Chen ............... H04N 19/176 |
| 2018/0367814 | A1 | 12/2018 | Seregin |
| 2019/0104303 | A1 | 4/2019 | Xiu |
| 2019/0166370 | A1 | 5/2019 | Xiu et al. |
| 2020/0029091 | A1* | 1/2020 | Chien ............... H04N 19/139 |
| 2020/0221122 | A1* | 7/2020 | Ye ............... H04N 19/176 |
| 2020/0366935 | A1* | 11/2020 | Salehifar ............... H04N 19/60 |
| 2020/0396453 | A1* | 12/2020 | Zhang ............... H04N 19/577 |
| 2021/0084325 | A1* | 3/2021 | Lim ............... H04N 19/105 |
| 2021/0297672 | A1* | 9/2021 | Deng ............... H04N 19/132 |
| 2021/0321090 | A1* | 10/2021 | Deng ............... H04N 19/11 |
| 2021/0385499 | A1* | 12/2021 | Zhang ............... H04N 19/159 |
| 2022/0058239 | A1* | 2/2022 | Pfaff ............... G06F 17/16 |

FOREIGN PATENT DOCUMENTS

| | | |
|---|---|---|
| CN | 103765892 A | 4/2014 |
| CN | 107087197 A | 8/2017 |
| CN | 107483932 A | 12/2017 |
| CN | 107787583 A | 3/2018 |
| CN | 108353193 A | 7/2018 |
| CN | 112956195 A | 6/2021 |
| CN | 113678440 A | 11/2021 |
| CN | 113678453 A | 11/2021 |
| WO | 2017084512 A1 | 5/2017 |

OTHER PUBLICATIONS

Vcgit.hhi.fraunhofer.de/jvet/VVCSoftware_VTM/tags/VTM-4.0, Nov. 14, 2022.
De-Luxan-Hernandez et al. "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0102, 2019.
Pfaff et al. "CE3: Affine Linear Weighted Intra Prediction (CE3-4.1, CE3-4.2)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0217, 2019.
Karczewicz et al. "CE8-Related: Quantized Residual BDPCM," Joint Video Experts Team {JVET} of ITU-T SG 16 WP 3 and ISO/IEC JTC 1/SC 29/WG 11, 14th Meeting, Geneva, CH, Mar. 19-27, 2019, document JVET-N0413, 2019.
Koo et al. "CE6: Reduced Secondary Transform (RST) (CE6-3.1)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0193, 2019.
Salehifar et al. "CE 6.2.6: Reduced Secondary Transform (RST)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0099, 2018.
Koo et al. "CE6-2.1: Reduced Secondary Transform (RST)," Joint Video Experts Team {JVET} of ITU-T SG 16 WP 3 and ISO/IEC JTC 1/SC 29/WG 11, 12th Meeting, Macao, CN, Oct. 3-12, 2018, document JVET-L0133, 2018.
Wang et al. "CE3-Related: A Unified MPM List for Intra Coding," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0185, 0019.
Hao et al. "CE3-related: Modifications on MPM List Generation," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0494, 2019.
Document: JVET-M1001-v7, Bross, B., et al., "Versatile Video Coding (Draft 4)," Joint Video Experts Team (JVET) of ITU-T SG 16 WP 3 and ISO/IEC JTC 1/SC 29/WG 11 13th Meeting: Marrakech, MA, Jan. 9-18, 2019, 300 pages.
International Search Report and Written Opinion from International Patent Application No. PCT/CN2020/089559 dated Aug. 10, 2020 (11 pages).
Foreign Communication From a Counterpart Application, European Application No. 20806889.0, Extended European Search Report dated May 19, 2022, 16 pages.
Office Action dated Feb. 22, 2022, 16 pages, U.S. Appl. No. 17/502,258, filed Oct. 15, 2021.
Notice of Allowance dated Jun. 20, 2022, 7 pages, U.S. Appl. No. 17/502,258, filed Oct. 15, 2021.
Document: JVET-M0413, Said, A., et al., "CE5: Per-context CABAC initialization with single window (Test 5.1.4)," Joint Video Experts Team (JVET) of ITU-T SG 16 WP 3 and ISO/IEC JTC 1/SC 29/WG 11 13th Meeting: Marrakech, MA, Jan. 9-18, 2019, 3 pages.
Document: JVET-N0010-v1, Duenas, A., et al., "JVET AHG report: Encoding algorithm optimizations (AHG10)," Joint Video Experts Team (JVET) of ITU-T SG 16 WP 3 and ISO/IEC JTC 1/SC 29/WG 11 14th Meeting: Geneva, CH, Mar. 19-27, 2019, 2 pages.
Document: JVET-M1001-v6, Bross, B., et al., "Versatile Video Coding (Draft 4)," Joint Video Experts Team (JVET) of ITU-T SG 16 WP 3 and ISO/IEC JTC 1/SC 29/WG 11 13th Meeting: Marrakech, MA, Jan. 9-18, 2019, JVET-N0413_drafttext_v4, 300 pages.
Document: JVET-N0413, Karczewicz, M., et al., "CE8-related: Quantized Residual BDPCM," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.

* cited by examiner

SPLIT_TT_HOR

SPLIT_TT_VER

SPLIT_BT_HOR

SPLIT_BT_VER

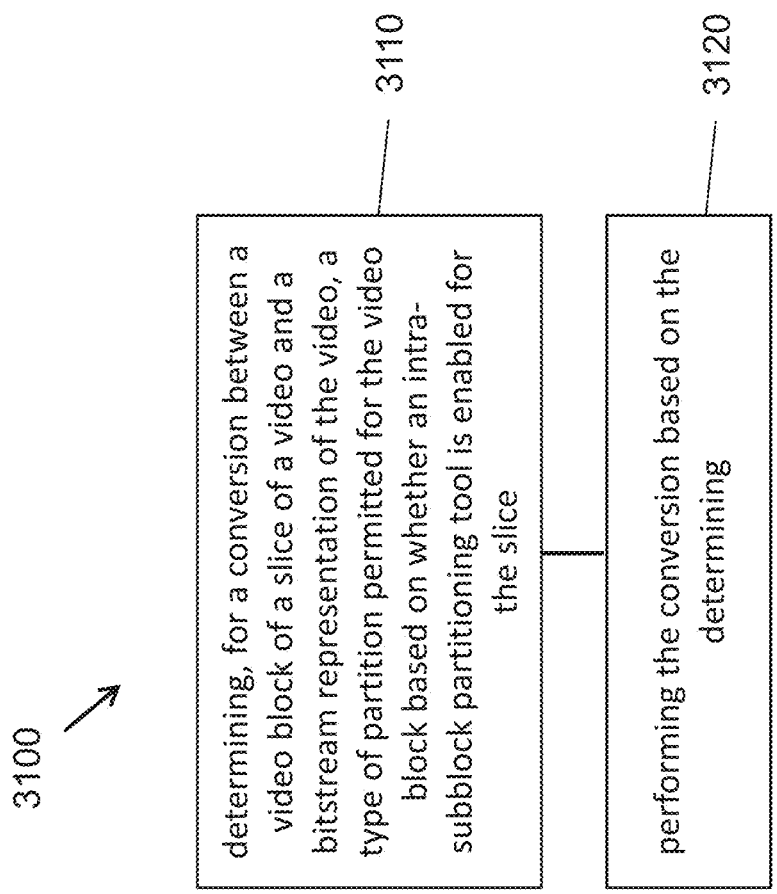

INTERACTIONS AMONG MULTIPLE INTRA CODING METHODS

CROSS REFERENCE TO RELATED APPLICATIONS

This application is a continuation application of U.S. patent application Ser. No. 17/502,258 filed on Oct. 15, 2021 which is a continuation of International Application No. PCT/CN2020/089559, filed on May 11, 2020, which claims the priority to and benefit of International Patent Application No. PCT/CN2019/086489, filed on May 11, 2019, all of which are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

The present document describes various embodiments and techniques in which a secondary transform is used during decoding or encoding of video or images.

In one example aspect, a method of video processing is disclosed. The method includes determining, for a conversion between a block of a video and a bitstream representation of the video, a manner in which information for a Matrix-based Intra Prediction (MIP) coding technique is coded in the bitstream representation. Using the MIP coding technique, a prediction block of the block is determined using the MIP coding technique based on performing a matrix vector multiplication operation on previously coded samples of the video. The method also includes performing the conversion based on the determining.

In another example aspect, a method of video processing is disclosed. The method includes determining, for a conversion between a block of a video and a bitstream representation of the video, that exactly two intra prediction modes are allowed in case the block is coded using a particular coding technique. The method also includes performing the conversion based on the determining.

In another example aspect, a method of video processing is disclosed. The method includes determining, for a conversion between a block of a video and a bitstream representation of the video, to perform a prediction of a sub-partition of the block using samples of the block or samples of one or more previously coded sub-partitions of the block. The block is coded using an Intra Subblock Partitioning (ISP) coding technique in which the block is partitioned into multiple sub-partitions and a prediction of each sub-partition is determined based on a previously reconstructed sub-partition. The multiple sub-partitions include a first sub-partition and one or more inner sub-partitions. The method also includes performing the conversion based on the determining.

In another example aspect, a method of video processing is disclosed. The method includes determining, for a conversion between a current block of a video and a bitstream representation of the video, that a first set of neighbouring blocks of the current block to be examined in a construction process of a list of Most Probable Mode (MPM) candidates is different than a second set of neighbouring blocks of a previously coded block. The current block is a child block of a parent block that is partitioned into multiple child blocks. The method also includes performing the conversion based on the determining.

In another example aspect, a method of video processing is disclosed. The method includes determining, for a conversion between a video block of a slice of a video and a bitstream representation of the video, a type of partition permitted for the video block based on whether an intra-subblock partitioning tool is enabled for the slice. The method also includes performing the conversion based on the determining.

In one example aspect, a method of video processing is disclosed. The method includes generating or receiving a bitstream representing a block of video data. The block of video data is coded based on Affine Linear Weighted Intra Prediction (ALWIP). Side information of the ALWIP and side information of Quantized Residual Block Differential Pulse Code Modulation (BDCPM) (QR-BDPCM) are coded sequentially in a first order in the bitstream.

In another example aspect, a method of video processing is disclosed. The method includes generating or receiving a bitstream representing a block of video data, wherein the block of video data is coded using an intra prediction method with only two intra prediction modes.

In another example aspect, a method of video processing is disclosed. The method includes constructing a Most-Probable-Mode (MPM) list for a current block in multiple blocks of video data by checking a set of neighbouring blocks of the current block. The multiple blocks are generated by partitioning a video unit using a partition pattern, and the set of neighbouring blocks is determined based on the partition pattern. The method also includes coding the current block of video data using a candidate from the MPM list and generating a bitstream representing the current block of video data.

In another example aspect, a method of video processing is disclosed. The method includes receiving a bitstream representing multiple blocks of video data. A current block of video data is coded in the bitstream using a candidate from a Most-Probable-Mode (MPM) list, and the MPM list is constructed by checking a set of neighbouring blocks of the current block. The multiple blocks are generated by partitioning a video unit using a partition pattern. The set of neighbouring blocks is determined based on the partition pattern. The method also includes reconstructing the current block of video data using the bitstream.

In yet another example aspect, a video encoder is disclosed. The video encoder comprises a processor configured to implement one or more of the above-described methods.

In yet another example aspect, a video decoder is disclosed. The video decoder comprises a processor configured to implement one or more of the above-described methods.

In yet another example aspect, a computer readable medium is disclosed. The medium includes code for implementing one or more of the above-described methods stored on the medium.

These, and other, aspects are described in the present document.

BRIEF DESCRIPTION OF DRAWINGS

FIG. 31 is a flowchart representation of yet another method for video processing according to various embodiments of the present disclosure.

DETAILED DESCRIPTION

Section headings are used in the present document to facilitate ease of understanding and do not limit the embodiments disclosed in a section to only that section. Furthermore, while certain embodiments are described with reference to Versatile Video Coding (VVC) or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

This patent document is related to video coding technologies. Specifically, it is related to intra and transform coding in image/video coding. The techniques disclosed herein can be applied to the existing video coding standard like HEVC or the standard Versatile Video Coding (VVC). The techniques are also applicable to future video coding standards or video codec.

2. Initial Discussion

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) [1] standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM) [2]. In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Coding Flow of a Typical Video Codec

Figure 1:
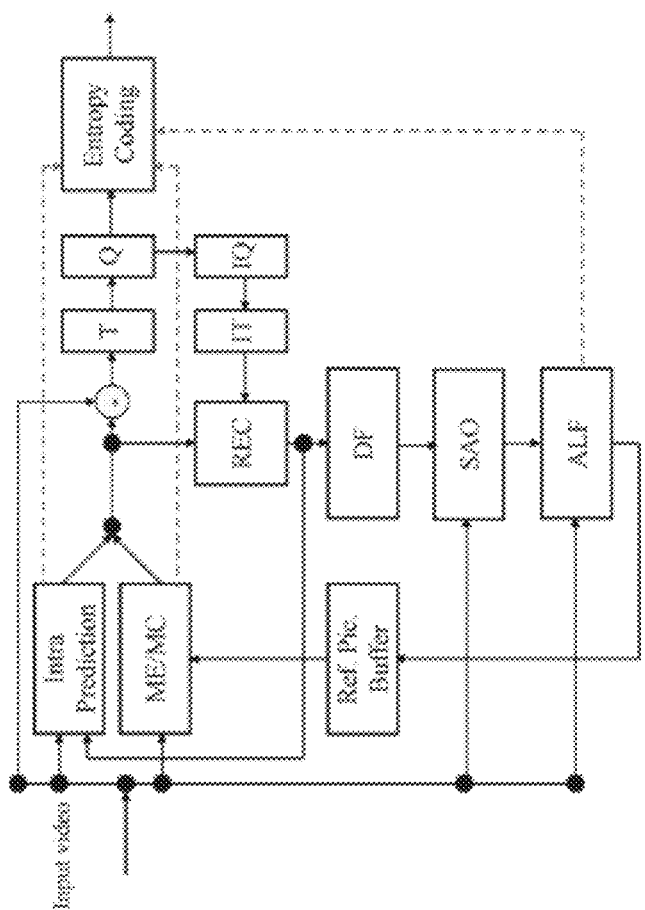
FIG. 1 shows an example of an encoder block diagram.

FIG. 1 shows an example of encoder block diagram of VVC, which contains three in-loop filtering blocks: deblocking filter (DF), sample adaptive offset (SAO) and adaptive loop filter (ALF). Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signalling the offsets and filter coefficients. ALF is located at the last processing stage of each picture and can be regarded as a tool trying to catch and fix artifacts created by the previous stages.

2.2 Intra Mode Coding with 67 Intra Prediction Modes

To capture the arbitrary edge directions presented in natural video, the number of directional intra modes is extended from 33, as used in HEVC, to 65. The additional directional modes are depicted as red dotted arrows in FIG. 2, and the planar and DC modes remain the same. These denser directional intra prediction modes apply for all block sizes and for both luma and chroma intra predictions.

Figure 2:
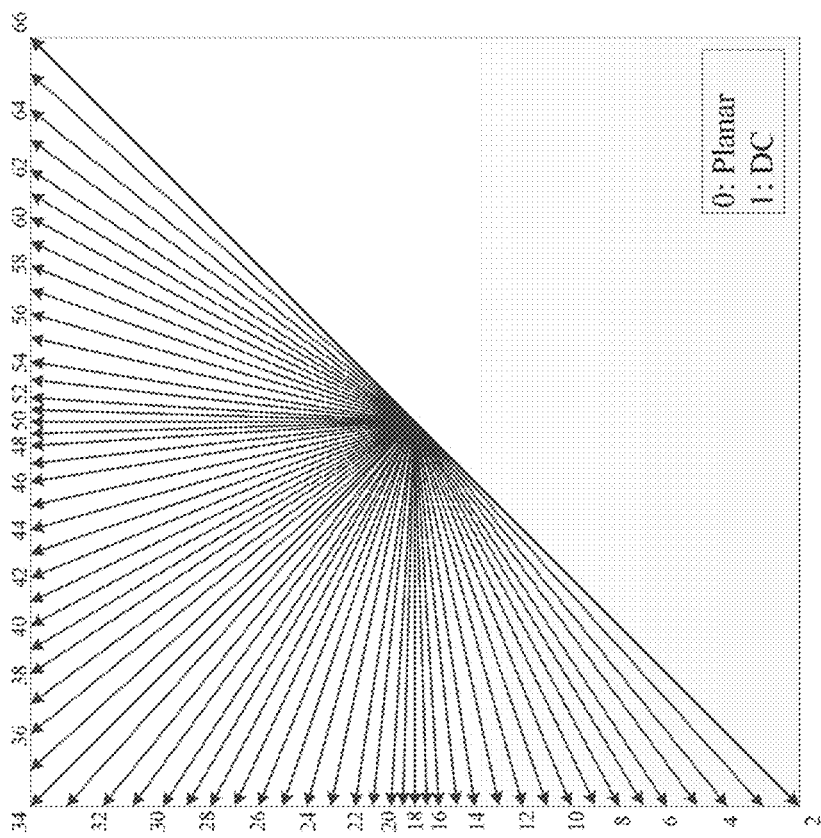
FIG. 2 shows an example of 67 intra prediction modes.

Conventional angular intra prediction directions are defined from 45 degrees to −135 degrees in clockwise direction as shown in FIG. 2. In the VVC test model (VTM) 2, several conventional angular intra prediction modes are adaptively replaced with wide-angle intra prediction modes for the non-square blocks. The replaced modes are signalled using the original method and remapped to the indexes of wide angular modes after parsing. The total number of intra prediction modes is unchanged, e.g., 67, and the intra mode coding is unchanged.

In the HEVC, every intra-coded block has a square shape and the length of each of its side is a power of 2. Thus, division operations may not be required to generate an intra-predictor using DC mode. In VVC, blocks can have a rectangular shape that necessitates the use of a division operation per block in the general case. To avoid division operations for DC prediction, only the longer side is used to compute the average for non-square blocks.

2.3 Multiple Reference Line

Figure 3:
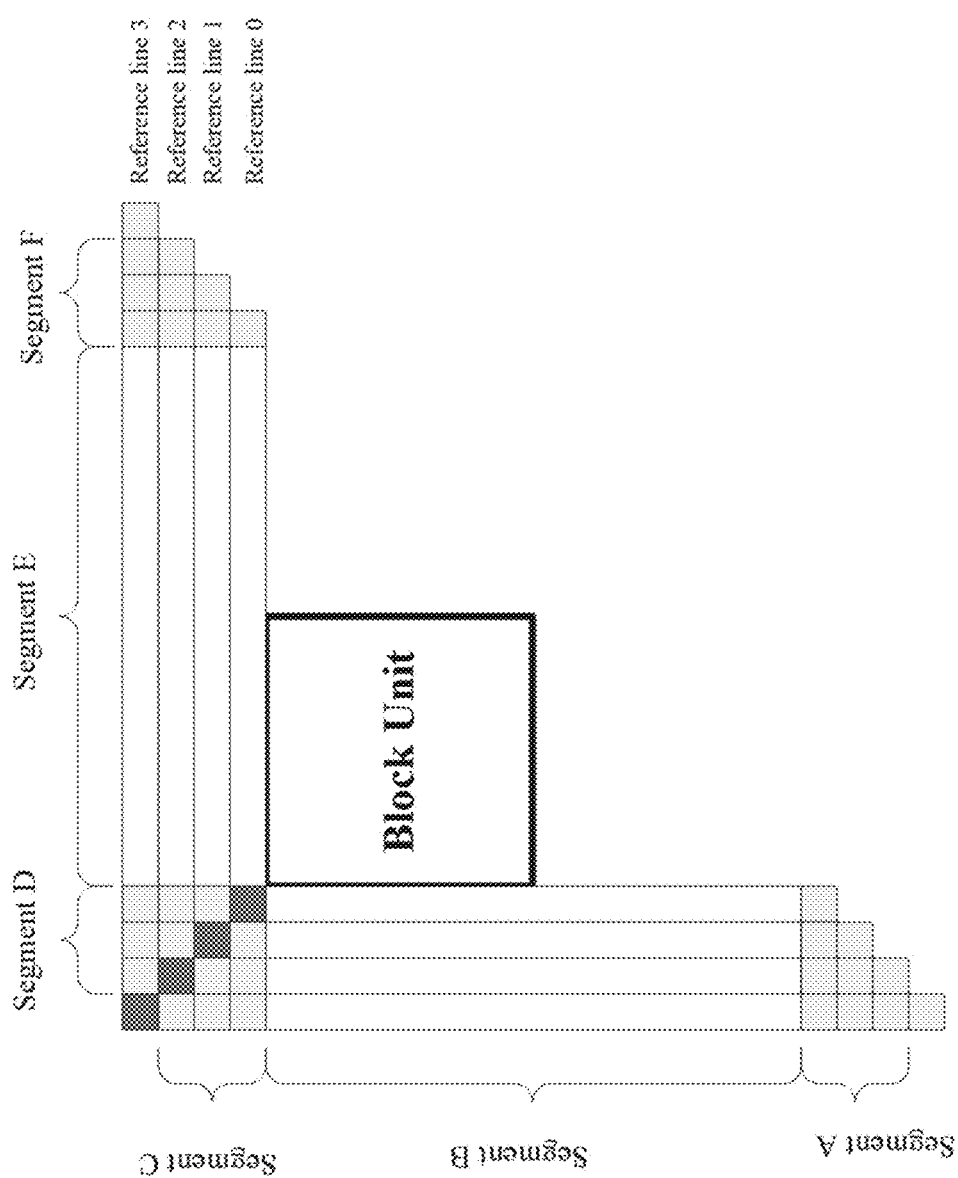
FIG. 3 depicted an example of four reference lines.

Multiple reference line (MRL) intra prediction uses more reference lines for intra prediction. In FIG. 3, an example of 4 reference lines is depicted, where the samples of segments A and F are not fetched from reconstructed neighbouring samples but padded with the closest samples from Segment B and E, respectively. HEVC intra-picture prediction uses the nearest reference line (e.g., reference line 0). In MRL, 2 additional lines (reference line 1 and reference line 3) are used.

The index of selected reference line (mrl_idx) is signalled and used to generate intra predictor. For reference line index, which is greater than 0, only include additional reference line modes in MPM list and only signal MPM index without remaining mode. The reference line index is signalled before intra prediction modes, and Planar and DC modes are excluded from intra prediction modes in case a nonzero reference line index is signalled.

MRL is disabled for the first line of blocks inside a coding tree unit (CTU) to prevent using extended reference samples outside the current CTU line. Also, PDPC is disabled when additional line is used.

2.4 Intra Subblock Partitioning (ISP)

Figure 4:
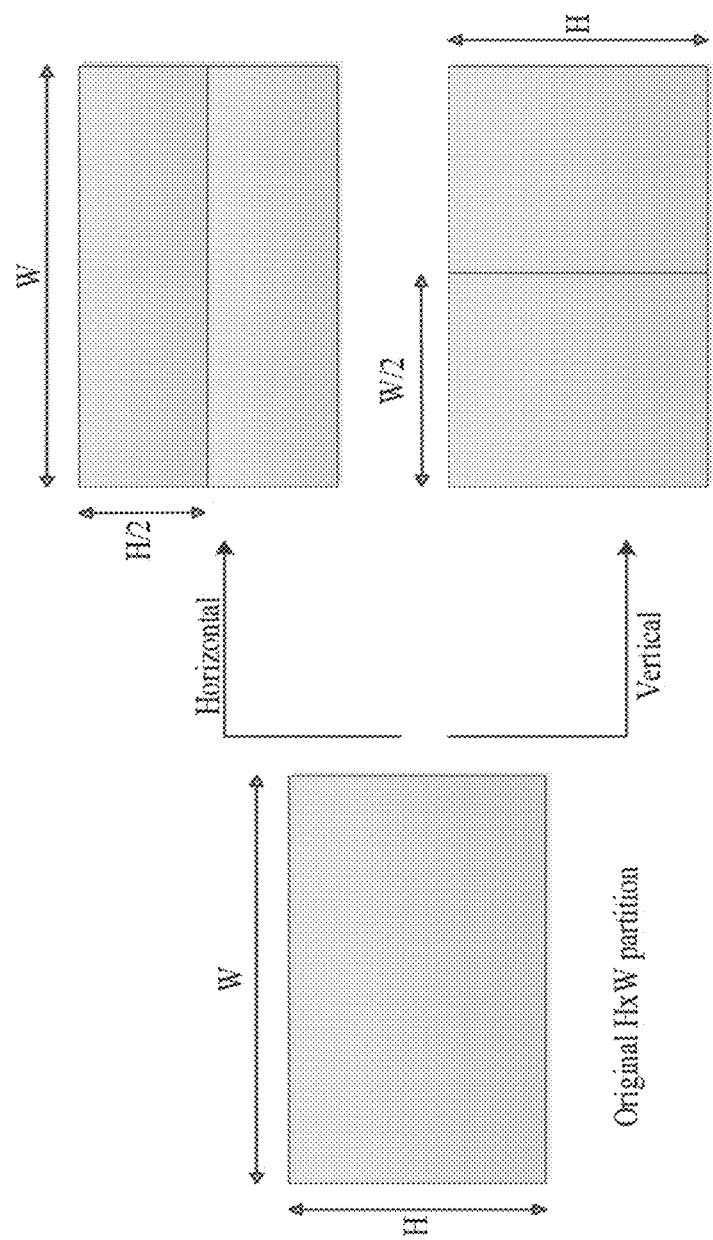
FIG. 4 is an example of division of 4×8 and 8×4 blocks.
Figure 5:
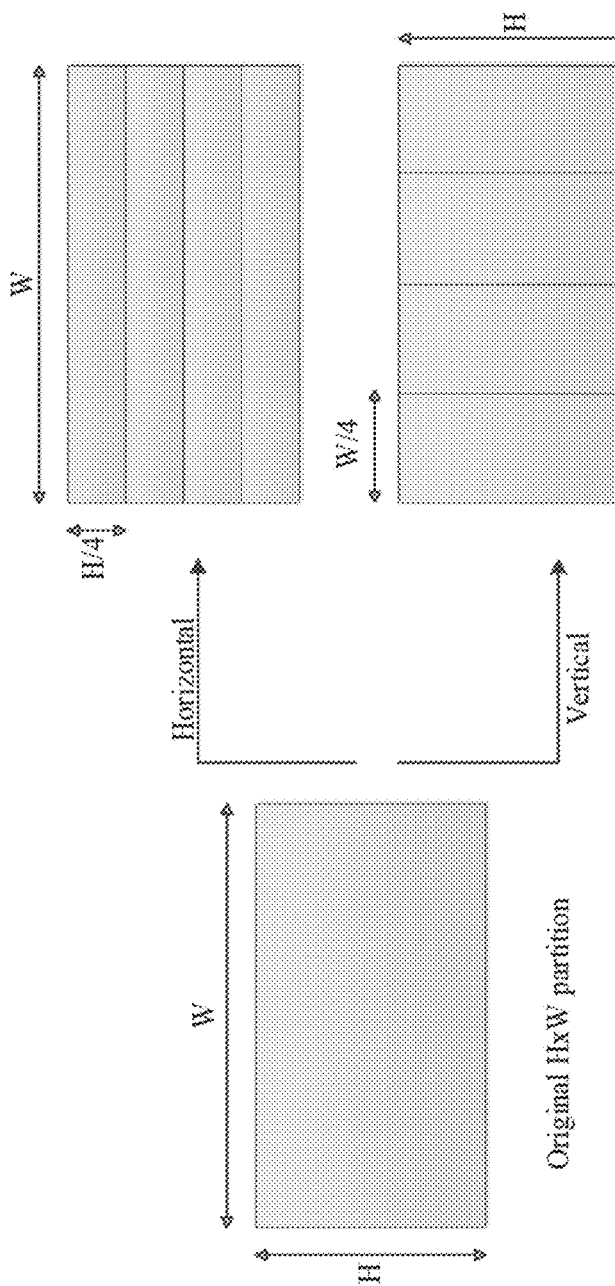
FIG. 5 is an example of division of all blocks except 4×8, 8×4 and 4×4.

In some embodiments, ISP is used to divide luma intra-predicted blocks vertically or horizontally into 2 or 4 sub-partitions depending on the block size dimensions, as shown in Table. FIG. 4 and FIG. 5 show examples of the two possibilities. FIG. 4 shows an example of division of 4×8 and 8×4 blocks. FIG. 5 shows an example of division of all blocks except 4×8, 8×4 and 4×4. All sub-partitions fulfill the condition of having at least 16 samples. For block sizes, 4×N or N×4 (with N>8), if allowed, the 1×N or N×1 sub-partition may exist.

TABLE 1

Number of sub-partitions depending on the block size.

| Splitting direction | Block Size | Number of Sub-Partitions |
|---|---|---|
| N/A | minimum transform size | Not divided |
| 4 × 8: horizontal 8 × 4: vertical | 4 × 8 and 8 × 4 | 2 |
| Signaled | If neither 4 × 8 nor 8 × 4, and W <= maxTBSize and H <= maxTBSize | 4 |
| Horizontal | If not above cases and H > maxTBSize | 4 |
| Vertical | If not above cases and H > maxTBSize | 4 |

For each of these sub-partitions, a residual signal is generated by entropy decoding the coefficients sent by the encoder and then invert quantizing and invert transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

Table 2 shows example transform types based on intra prediction mode(s).

TABLE 2

Specification of trTypeHor and trTypeVer depending on predModeIntra

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | ( nTbW >= 4 && nTbW <= 16 ) ? DST-VII : DCT-II | ( nTbH >= 4 && nTbH <= 16 ) ? DST-VII : DCT-II |
| INTRA_ANGULAR33, INTRA_ANGULAR35 | DCT-II | DCT-II |
| INTRA_ANGULAR2, INTRA_ANGULAR4,...,INTRA_ANGULAR28, INTRA_ANGULAR30, INTRA_ANGULAR39, INTRA_ANGULAR41,...,INTRA_ANGULAR63, INTRA_ANGULAR65 | ( nTbW >= 4 && nTbW <= 16 ) ? DST-VII : DCT-II | DCT-II |
| INTRA_ANGULAR3, | DCT-II | ( nTbH >= 4 && |

TABLE 2-continued

Specification of trTypeHor and trTypeVer depending on predModeIntra

| predModeIntra | trTypeHor | trTypeVer |
|---|---|---|
| INTRA_ANGULAR5,..., INTRA_ANGULAR27, INTRA_ANGULAR29, INTRA_ANGULAR38, INTRA_ANGULAR40,...,INTRA_ANGULAR64, INTRA_ANGULAR66 | | nTbH <= 16 ) ? DST-VII : DCT-II |

2.4.1 Example Syntax and Semantics

The portions below in bold and underlines indicate proposed modifications to the standard.

7.3.7.5 Coding Unit Syntax

| | Descriptor |
|---|---|
| coding_unit( x0, y0, cbWidth, cbHeight, treeType ) { | |
|   if( slice_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && slice_type != I ) | |
|       pred_mode_flag | ae(v) |
|     if( ( ( slice_type = = I && cu_skip_flag[ x0 ][ y0 ] = =0 ) \|\| | |
|       ( slice_type != I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \|\| treeType = = DUAL_TREE_LUMA ) { | |
|         if( ( y0% CtbSizeY ) > 0 ) | |
|           intra_luma_ref_idx[ x0 ][ y0 ] | ae(v) |
|         if (intra_luma_ref_idx[ x0 ][ y0 ] = = 0 && | |
|           ( cbWidth <= MaxTbSizeY \|\| cbHeight <= MaxTbSizeY ) && | |
|           **( cbWidth * cbHeight > MinTbSizeY * MinTbSizeY ))** | |
|           intra_subpartitions_mode_flag[ x0 ][ y0 ] | ae(v) |
|         if( intra_subpartitions_mode_flag[ x0 ][ y0 ] = = 1 && | |
|           cbWidth <= MaxTbSizeY && cbHeight <= MaxTbSizeY ) | |
|           intra_subpartitions_split_flag[ x0 ][ y0 ] | ae(v) |
|         if( intra_luma_ref_idx[ x0 ][ y0 ] = = 0 && | |
|           intra_subpartitions_mode_flag[ x0 ][ y0 ] = = 0 ) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
|         Else | |
|           intra_luma_mpm_remainder[ x0 ][ y0 ] | ae(v) |
|       } | |
|       if( treeType = = SINGLE_TREE \|\| treeType = = DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER or MODE_IBC */ | |
|     ... | |
|   } | |
|   ... | |
| } | |

7.3.7.10 Transform Unit Syntax

| | Descriptor |
|---|---|
| transform_unit( x0, y0, tbWidth, tbHeight, treeType, subTuIndex ) { | |
|   if( treeType = = SINGLE_TREE \|\| treeType = = DUAL_TREE_LUMA ) { | |
|     if( ( IntraSubPartitionsSplitType = = ISP_NO_SPLIT && !( cu_sbt_flag && | |
|       ( ( subTuIndex = = 0 && cu_sbt_pos_flag ) \|\| | |
|         ( subTuIndex = = 1 && !cu_sbt_pos_flag ) ) ) ) \|\| | |
|       ( IntraSubPartitionsSplitType != ISP_NO_SPLIT && | |
|         ( subTuIndex < NumIntraSubPartitions − 1 \|\| !InferTuCbfLuma ) ) ) | |
|       tu_cbf_luma[ x0 ][ y0 ] | ae(v) |
|     if (IntraSubPartitionsSplitType != ISP_NO_SPLIT ) | |
|       InferTuCbfLuma = InferTuCbfLuma && !tu_cbf_luma[ x0 ][ y0 ] | |
|   } | |
|   if( ( treeType = = SINGLE_TREE \|\| treeType = = DUAL_TREE_CHROMA ) | |
| { | |
|     if( ( IntraSubPartitionsSplitType = = ISP_NO_SPLIT && !( cu_sbt_flag && | |
|       ( ( subTuIndex = = 0 && cu_sbt_pos_flag ) \|\| | |
|         ( subTuIndex = = 1 && !cu_sbt_pos_flag ) ) ) ) \|\| | |
|       ( IntraSubPartitionsSplitType != ISP_NO_SPLIT && | |
|         ( subTuIndex = = NumIntraSubPartitions − 1 ) ) ) { | |
|     tu_cbf_cb[ x0 ][ y0 ] | ae(v) |
|       tu_cbf_cr[ x0 ][ y0 ] | ae(v) |
|     } | |
|   } | |
|   if( IntraSubPartitionsSplitType != ISP_NO_SPLIT && | |
|     treeType = = SINGLE_TREE && subTuIndex = = | |
| NumIntraSubPartitions − 1 ) ) | |
|     xC = CbPosX[ x0 ][ y0 ] | |
|     yC = CbPosY[ x0 ][ y0 ] | |
|     wC = CbWidth[ x0 ][ y0 ] / 2 | |
|     hC = CbHeight[ x0 ][ y0 ] / 2 | |
|   } else | |
|     xC = x0 | |
|     yC = y0 | |
|     wC = tbWidth / SubWidthC | |
|     hC = tbHeight / SubHeightC | |
|   } | |
|   if( ( tu_cbf_luma[ x0 ][ y0 ] \|\| tu_cbf_cb[ x0 ][ y0 ] \|\| | |
| tu_cbf_cr[ x0 ][ y0 ] ) && | |
|     treeType != DUAL_TREE_CHROMA ) { | |
|     if( cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |
|   } | |
|   if( tu_cbf_luma[ x0 ][ y0 ] && treeType != DUAL_TREE_CHROMA | |
|     && ( tbWidth <= 32 ) && ( tbHeight <= 32 ) | |
|     && ( IntraSubPartitionsSplit[ x0 ][ y0 ] = = ISP_NO_SPLIT ) | |
| && ( !cu_sbt_flag ) ) { | |
|     if( transform_skip_enabled_flag && tbWidth <= MaxTsSize && tbHeight | |
| <= MaxTsSize ) | |
|       transform_skip_flag[ x0 ][ y0 ] | ae(v) |
|     if( ((  CuPredMode[ x0 ][ y0 ] != MODE_INTRA && | |
| sps_explicit_mts_inter_enabled_flag ) | |
|       \|\| ( CuPredMode[ x0 ][ y0 ] = = MODE_INTRA && | |
| sps_explicit_mts_intra_enabled_flag )) | |
|       && ( tbWidth <= 32 ) && ( tbHeight <= 32 ) && | |
| ( !transform_skip_flag[ x0 ][ y0 ] ) ) | |
|       tu_mts_idx[ x0 ][ y0 ] | ae(v) |
|   } | |
|   if( tu_cbf_luma[ x0 ][ y0 ] ) | |
|     residual_coding( x0, y0, Log2( tbWidth ), Log2( tbHeight ), 0 ) | |
|   if( tu_cbf_cb[ x0 ][ y0 ] ) | |
|     residual_coding( xC, yC, Log2( wC ), Log2( hC ), 1 ) | |
|   if( tu_cbf_cr[ x0 ][ y0 ] ) | |
|     residual_coding( xC, yC, Log2( wC ), Log2( hC ), 2 ) | |
| } | | intra_subpartitions_mode_flag[x0][y0] equal to 1 specifies that the current intra coding unit is partitioned into NumIntraSubPartitions[x0][y0] rectangular transform block subpartitions. intra_subpartitions_mode_flag[x0][y0] equal to 0 specifies that the current intra coding unit is not partitioned into rectangular transform block subpartitions. When intra_subpartitions_mode_flag[x0][y0] is not present, it is inferred to be equal to 0. intra_subpartitions_split_flag[x0][y0] specifies whether the intra subpartitions split type is horizontal or vertical. When intra_subpartitions_split_flag[x0][y0] is not present, it is inferred as follows:

If cbHeight is greater than MaxTbSizeY, intra_subpartitions_split_flag[x0][y0] is inferred to be equal to 0.

Otherwise (cbWidth is greater than MaxTbSizeY), intra_subpartitions_split_flag[x0][y0] is inferred to be equal to 1.

The variable IntraSubPartitionsSplitType specifies the type of split used for the current luma coding block. IntraSubPartitionsSplitType is derived as follows:
If intra_subpartitions_mode_flag[x0][y0] is equal to 0, IntraSubPartitionsSplitType is set equal to 0.
Otherwise, the IntraSubPartitionsSplitType is set equal to 1+intra_subpartitions_split_flag[x0][y0].

TABLE 7-9

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block subpartitions an intra luma coding block is divided into. NumIntraSubPartitions is derived as follows:
If IntraSubPartitionsSplitType is equal to ISP_NO_SPLIT, NumIntraSubPartitions is set equal to 1.
Otherwise, if one of the following conditions is true, NumIntraSubPartitions is set equal to 2:
cbWidth is equal to 4 and cbHeight is equal to 8,
cbWidth is equal to 8 and cbHeight is equal to 4.
Otherwise, NumIntraSubPartitions is set equal to 4.

2.5 Affine Linear Weighted Intra Prediction (ALWIP, a.k.a. Matrix Based Intra Prediction)

2.5.1 Generation of the Reduced Prediction Signal by Matrix Vector Multiplication The neighbouring reference samples are firstly down-sampled via averaging to generate the reduced reference signal $bdry_{red}$. Then, the reduced prediction signal $pred_{red}$ is computed by calculating a matrix vector product and adding an offset:

$$pred_{red} = A \cdot bdry_{red} + b.$$

Here, A is a matrix that has $W_{red} \cdot H_{red}$ rows and 4 columns if W=H=4 and 8 columns in all other cases. b is a vector of size $W_{red} \cdot H_{red}$.

2.5.2. Illustration of the Entire ALWIP Process

The entire process of averaging, matrix vector multiplication and linear interpolation is illustrated for different shapes in FIG. 6 to FIG. 9. Note, that the remaining shapes are treated as in one of the depicted cases.

Figure 6:
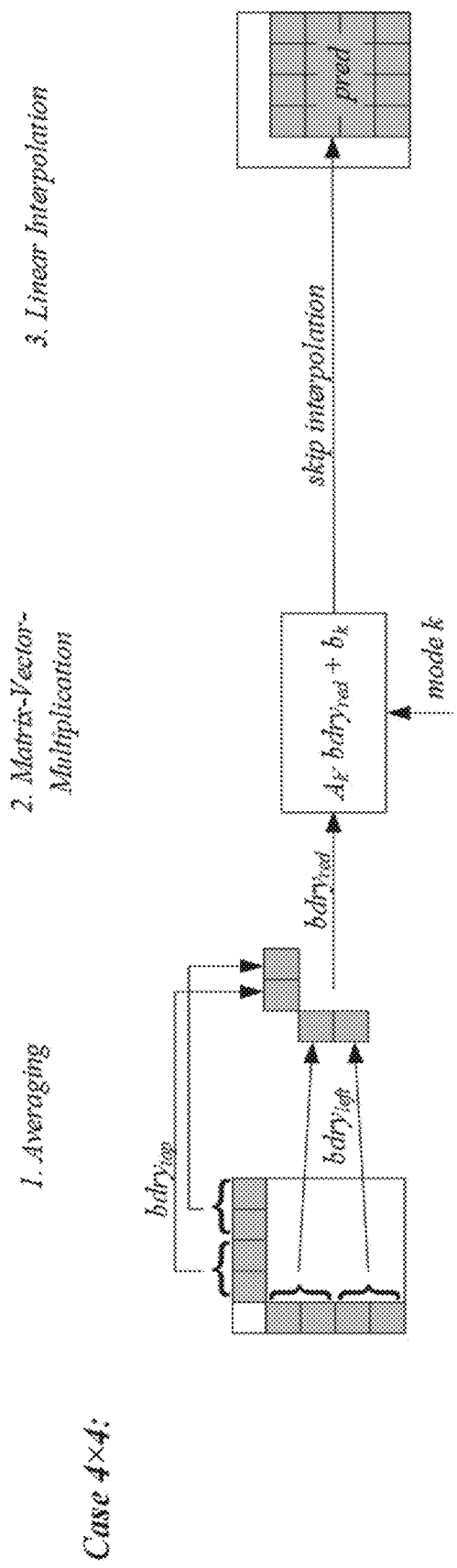
FIG. 6 is an example of Affine Linear Weighted Intra Prediction (ALWIP) for 4×4 blocks.

Given a 4×4 block, as shown in FIG. 6, ALWIP takes two averages along each axis of the boundary. The resulting four input samples enter the matrix vector multiplication. The matrices are taken from the set S_0. After adding an offset, this yields the 16 final prediction samples. Linear interpolation is not necessary for generating the prediction signal. Thus, a total of (4·16)/(4·4)=4 multiplications per sample are performed.

Figure 7:
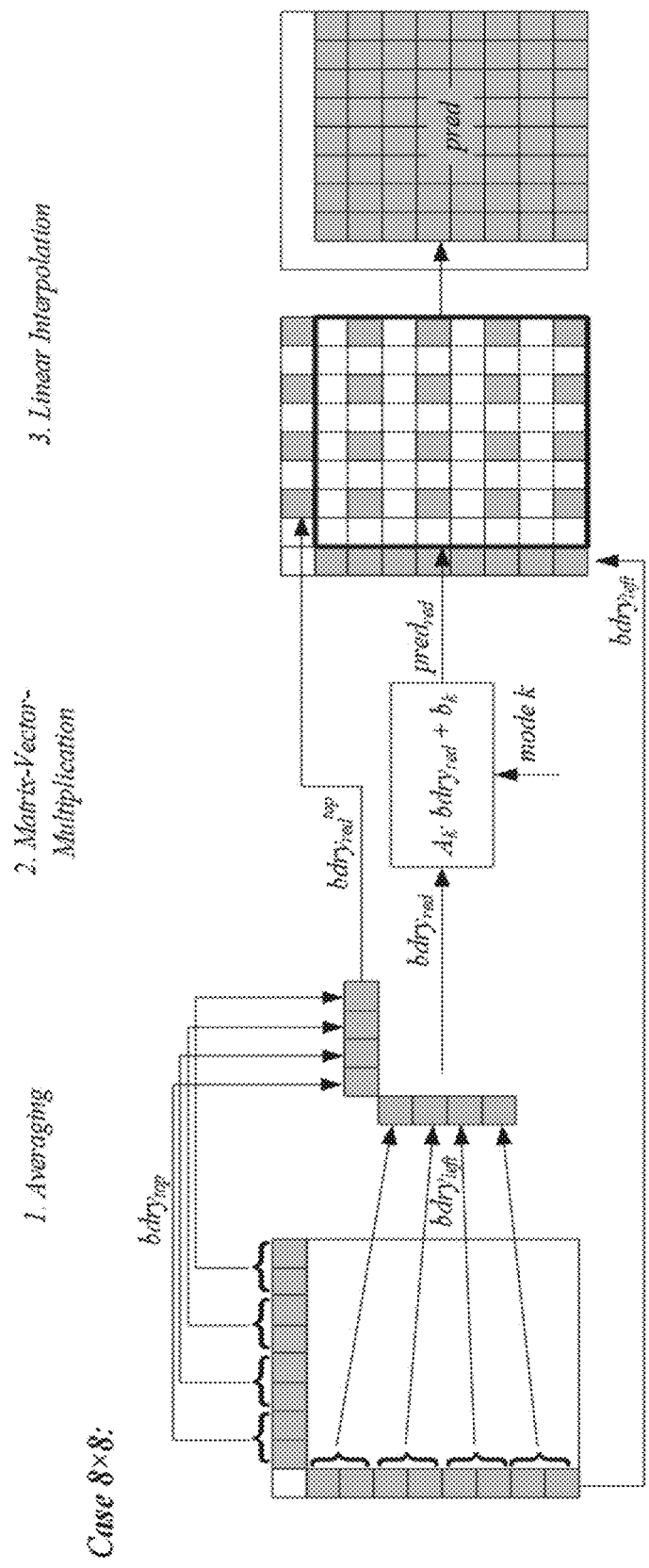
FIG. 7 is an example of ALWIP for 8×8 blocks.

Given an 8×8 block, as shown in FIG. 7, ALWIP takes four averages along each axis of the boundary. The resulting eight input samples enter the matrix vector multiplication. The matrices are taken from the set S_1. This yields 16 samples on the odd positions of the prediction block. Thus, a total of (8·16)/(8·8)=2 multiplications per sample are performed. After adding an offset, these samples are interpolated vertically by using the reduced top boundary. Horizontal interpolation follows by using the original left boundary.

Figure 8:
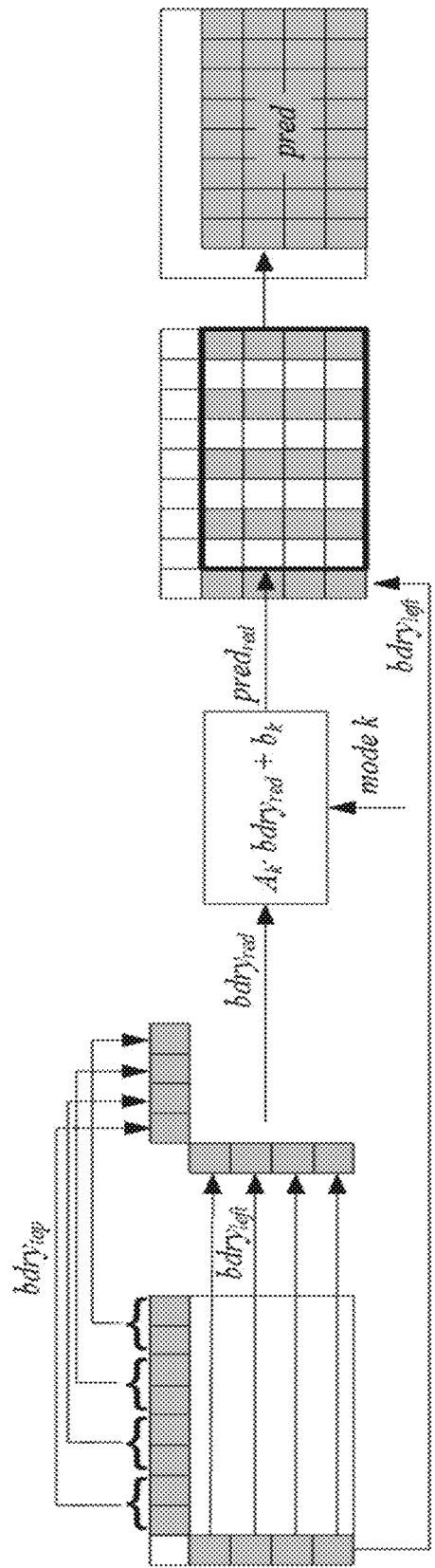
FIG. 8 is an example of ALWIP for 8×4 blocks.

Given an 8×4 block, as shown in FIG. 8, ALWIP takes four averages along the horizontal axis of the boundary and the four original boundary values on the left boundary. The resulting eight input samples enter the matrix vector multiplication. The matrices are taken from the set S_1. This yields 16 samples on the odd horizontal and each vertical positions of the prediction block. Thus, a total of (8·16)/(8·4)=4 multiplications per sample are performed. After adding an offset, these samples are interpolated horizontally by using the original left boundary. The transposed case is treated accordingly.

Figure 9:
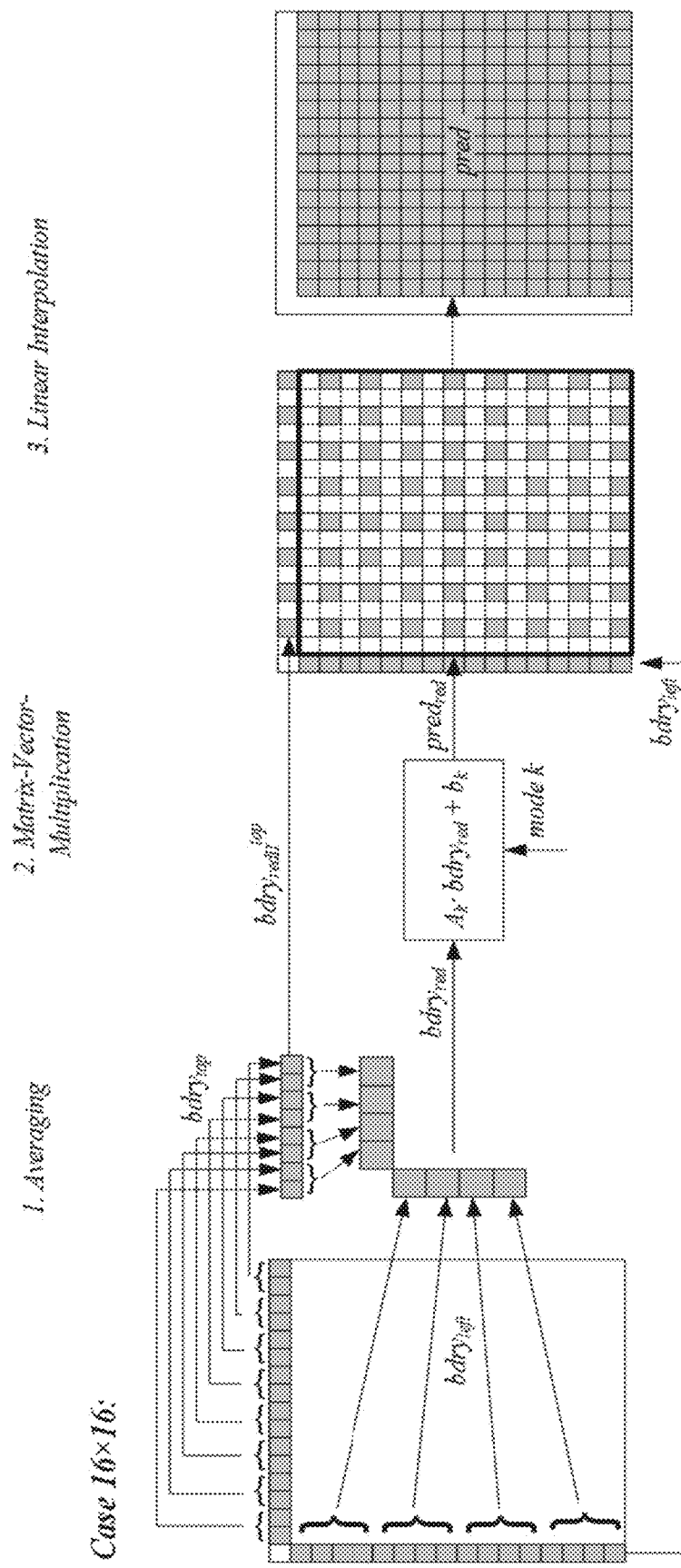
FIG. 9 is an example of ALWIP for 16×16 blocks.

Given a 16×16 block, as shown in FIG. 9, ALWIP takes four averages along each axis of the boundary. The resulting eight input samples enter the matrix vector multiplication. The matrices are taken from the set S_2. This yields 64 samples on the odd positions of the prediction block. Thus, a total of (8·64)/(16·16)=2 multiplications per sample are performed. After adding an offset, these samples are interpolated vertically by using eight averages of the top boundary. Horizontal interpolation follows by using the original left boundary. The interpolation process, in this case, does not add any multiplications. Therefore, totally, two multiplications per sample may be required to calculate ALWIP prediction.

For larger shapes, the procedure is essentially the same and it is easy to check that the number of multiplications per sample is less than four.

For W×8 blocks with W>8, only horizontal interpolation is necessary as the samples are given at the odd horizontal and each vertical position.

Finally, for W×4 blocks with W>8, let A_k be the matrix that arises by leaving out every row that corresponds to an odd entry along the horizontal axis of the down-sampled block. Thus, the output size is 32 and again, only horizontal interpolation remains to be performed.

The transposed cases are treated accordingly.

2.5.3. Adapted MPM-List Derivation for Conventional Luma and Chroma Intra Prediction Modes Some of ALWIP-modes are harmonized with the MPM-based coding of the conventional intra prediction modes as follows. The luma and chroma MPM-list derivation processes for the conventional intra prediction modes uses fixed tables map_alwip_to_angular$_{idx}$, idx∈{0,1,2}, mapping an ALWIP-mode predmode$_{ALWIP}$ on a given prediction unit (PU) to one of the conventional intra prediction modes predmode$_{Angular}$=map_alwip_to_angular$_{idx(PU)}$[predmode$_{ALWIP}$].

For the luma MPM-list derivation, whenever a neighbouring luma block is encountered which uses an ALWIP-mode predmode$_{ALWIP}$, this block is treated as if it was using the conventional intra prediction mode predmode$_{Angular}$. For the chroma MPM-list derivation, whenever the current luma block uses a LWIP-mode, the same mapping is used to translate the ALWIP-mode to a conventional intra prediction mode.

2.5.4 Example Syntax and Semantics

The portions below in bold and underlines indicate proposed modifications to the standard.

7.3.6.5 Coding Unit Syntax

Descriptor

```
coding_unit( x0, y0, cbWidth, cbHeight, treeType ) {
...
    if( CuPredMode[ x0 ][ y0 ] = = MODE_INTRA ) {
        if( sps_pcm_enabled_flag &&
            cbWidth >= MinIpcmCbSizeY && cbWidth <= MaxIpcmCbSizeY
```

|  | Descriptor |
|---|---|
| `&&`<br>    cbHeight >= MinIpcmCbSizeY && cbHeight <= MaxIpcmCbSizeY<br>)<br>    pcm_flag[ x0 ][ y0 ] | ae(v) |
|   if( pcm_flag[ x0 ][ y0 ] ) {<br>    while( !byte_aligned( ) )<br>      pcm_alignment_zero_bit | f(1) |
|     pcm_sample( cbWidth, cbHeight, treeType)<br>  } else {<br>    if( treeType = = SINGLE_TREE | | treeType = = DUAL_TREE_LUMA ) {<br>      if( abs( Log2( cbWidth ) − Log2( cbHeight ) ) <= 2 )<br>        <u>intra_lwip_flag[ x0 ][ y0 ]</u> | <u>ae(v)</u> |
|       <u>if( intra_lwip_flag[ x0 ][ y0 ] ) {</u><br>        <u>intra_lwip_mpm_flag[ x0 ][ y0 ]</u> | <u>ae(v)</u> |
|         <u>if( intra_lwip_mpm_flag[ x0 ][ y0 ] )</u><br>          <u>intra_lwip_mpm_idx[ x0 ][ y0 ]</u> | <u>ae(v)</u> |
|         <u>else</u><br>          <u>intra_lwip_mpm_remainder[ x0 ][ y0 ]</u> | <u>ae(v)</u> |
|       <u>} else {</u><br>      if( ( y0 % CtbSizeY ) > 0 )<br>        intra_luma_ref_idx[ x0 ][ y0 ] | ae(v) |
|       if (intra_luma_ref_idx[ x0 ][ y0 ] = = 0 &&<br>        ( cbWidth <= MaxTbSizeY | | cbHeight <= MaxTbSizeY ) &&<br>        ( cbWidth * cbHeight > MinTbSizeY * MinTbSizeY ))<br>        intra_subpartitions_mode_flag[ x0 ][ y0 ] | ae(v) |
|       if( intra_subpartitions_mode_flag[ x0 ][ y0 ] = = 1 &&<br>        cbWidth <= MaxTbSizeY && cbHeight <= MaxTbSizeY )<br>        intra_subpartitions_split_flag[ x0 ][ y0 ] | ae(v) |
|       if( intra_luma_ref_idx[ x0 ][ y0 ] = = 0 &&<br>        intra_subpartitions_mode_flag[ x0 ][ y0 ] = = 0 )<br>        intra_luma_mpm_flag[ x0 ][ y0 ] | ae(v) |
|       if( intra_luma_mpm_flag[ x0 ][ y0 ] )<br>        intra_luma_mpm_idx[ x0 ][ y0 ] | ae(v) |
|       else<br>        intra_luma_mpm_remainder[ x0 ][ y0 ] | ae(v) |
|       }<br>    }<br>    if( treeType = = SINGLE_TREE | | treeType = = DUAL_TREE_CHROMA )<br>      intra_chroma_pred_mode[ x0 ][ y0 ] | ae(v) |
|   }<br>  } else if( treeType != DUAL_TREE_CHROMA ) { /* MODE_INTER or MODE_IBC */<br>...<br>  }<br>} |  |

2.6 Quantized Residual Block Differential Pulse-Code Modulation (QR-BDPCM)

In some embodiments, a quantized residual block differential pulse-code modulation (QR-BDPCM) can be used to code screen contents efficiently.

The prediction directions used in QR-BDPCM can be vertical and horizontal prediction modes. The intra prediction is done on the entire block by sample copying in prediction direction (horizontal or vertical prediction) similar to intra prediction. The residual is quantized and the delta between the quantized residual and its predictor (horizontal or vertical) quantized value is coded. This can be described by the following: For a block of size M (rows)×N (cols), let $r_{i,j}$, $0 \leq i \leq M-1$, $0 \leq j \leq N-1$ be the prediction residual after performing intra prediction horizontally (copying left neighbor pixel value across the predicted block line by line) or vertically (copying top neighbor line to each line in the predicted block) using unfiltered samples from above or left block boundary samples. Let $Q(r_{i,j})$, $0 \leq i \leq M-1$, $0 \leq j \leq N-1$ denote the quantized version of the residual $r_{i,j}$, where residual is difference between original block and the predicted block values. Then the block Differential Pulse Coded Modulation (DPCM) is applied to the quantized residual samples, resulting in modified M×N array $\tilde{R}$ with elements $\tilde{r}_{i,j}$. When vertical BDPCM is signalled:

$$\tilde{r}_{i,j} = \begin{cases} Q(r_{i,j}), & i = 0, 0 \leq j \leq (N-1) \\ Q(r_{i,j}) - Q(r_{(i-1),j}), & 1 \leq i \leq (M-1), 0 \leq j \leq (N-1) \end{cases}$$

For horizontal prediction, similar rules apply, and the residual quantized samples are obtained by $$\tilde{r}_{i,j} = \begin{cases} Q(r_{i,j}), & 0 \leq i \leq (M-1), j = 0 \\ Q(r_{i,j}) - Q(r_{i,(j-1)}), & 0 \leq i \leq (M-1), 1 \leq j \leq (N-1) \end{cases}$$

The residual quantized samples $\tilde{r}_{i,j}$ are sent to the decoder.

On the decoder side, the above calculations are reversed to produce $Q(r_{i,j})$, $0 \leq i \leq M-1$, $0 \leq j \leq N-1$. For vertical prediction case, $$Q(r_{i,j}) = \Sigma_{k=0}^{i} \tilde{r}_{k,j}, 0 \leq i \leq (M-1), 0 \leq j \leq (N-1)$$

For horizontal case, $$Q(r_{i,j}) = \Sigma_{k=0}^{j} \tilde{r}_{i,k}, 0 \leq i \leq (M-1), 0 \leq j \leq (N-1)$$

The inverse quantized residuals, $Q^{-1}(Q(r_{i,j}))$, are added to the intra block prediction values to produce the reconstructed sample values.

The main benefit of this scheme is that the inverse DPCM can be done on the fly during coefficient parsing simply adding the predictor as the coefficients are parsed or it can be performed after parsing.

The draft text of QR-BDPCM are shown in below:
7.3.6.5 Coding Unit Syntax

|  | Descriptor |
|---|---|
| coding_unit( x0, y0, cbWidth, cbHeight, treeType ) { | |
|   if( tile_group_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && tile_group_type != I ) | |
|       pred_mode_flag | ae(v) |
|     if( ( ( tile_group_type = = I && cu_skip_flag[ x0 ][ y0 ] = =0 ) \|\| | |
|      ( tile_group_type != I && CuPredMode[ x0 ][ y0 ] != MODE_INTRA ) ) && | |
|      sps_ibc_enabled_flag ) | |
|       pred_mode_ibc_flag | ae(v) |
|   } | |
|   if( CuPredMode[ x0 ][ y0 ] = = MODE_INTRA ) { | |
|     if( pred_mode_flag = = MODE_INTRA && ( cIdx == 0 ) && | |
|      ( cbWidth <= 32 ) && ( CbHeight <= 32 )) { | |
|       bdpcm_flag[ x0 ][ y0 ] | ae(v) |
|      if( bdpcm_flag[ x0 ][ y0 ] ) { | |
|       bdpcm_dir_flag[ x0 ][ y0 ] | ae(v) |
|     } | |
|     else { | |
|     if( sps_pcm_enabled_flag && | |
|      cbWidth >= MinIpcmCbSizeY && cbWidth <= MaxIpcmCbSizeY && | |
|      cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|      if( treeType = = SINGLE_TREE \|\| treeType = = DUAL_TREE_LUMA ) { | |
|       if( ( y0 % CtbSizeY ) > 0 ) | |
|         intra_luma_ref_idx[ x0 ][ y0 ] | ae(v) |
|       if (intra_luma_ref_idx[ x0 ][ y0 ] = = 0 && | |
|        ( cbWidth <= MaxTbSizeY \|\| cbHeight <= MaxTbSizeY ) && | |
|        ( cbWidth * cbHeight > MinTbSizeY * MinTbSizeY )) | |
|         intra_subpartitions_mode_flag[ x0 ][ y0 ] | ae(v) |
|       if( intra_subpartitions_mode_flag[ x0 ][ y0 ] = = 1 && | |
|        cbWidth <= MaxTbSizeY && cbHeight <= MaxTbSizeY ) | |
|         intra_subpartitions_split_flag[ x0 ][ y0 ] | ae(v) |
|       if( intra_luma_ref_idx[ x0 ][ y0 ] = = 0 && | |
|        intra_subpartitions_mode_flag[ x0 ][ y0 ] = = 0 ) | |
|         intra_luma_mpm_flag[ x0 ][ y0 ] | ae(v) |
|       if( intra_luma_mpm_flag[ x0 ][ y0 ] ) | |
|         intra_luma_mpm_idx[ x0 ][ y0 ] | ae(v) |
|       else | |
|         intra_luma_mpm_remainder[ x0 ][ y0 ] | ae(v) |
|      } | |
|     } | |
|     if( treeType = = SINGLE_TREE \|\| treeType = = DUAL_TREE_CHROMA ) | |
|       intra_chroma_pred_mode[ x0 ][ y0 ] | ae(v) |
|     } | |
|   } else if( treeType != DUAL_TREE_CHROMA ) { /* MODE_INTER or MODE_IBC */ | |
|    ... | |
| } | | bdpcm_flag[x0][y0] equal to 1 specifies that a bdpcm_dir_flag is present in the coding unit including the luma coding block at the location (x0, y0)

bdpcm_dir_flag[x0][y0] equal to 0 specifies that the prediction direction to be used in a bdpcm block is horizontal, otherwise it is vertical.

2.7 Example Multiple Transform Set (MTS)

2.7.1 Explicit Multiple Transform Set (MTS)

In some embodiments, large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

In addition to discrete cosine transform (DCT)-II which has been employed in HEVC, a Multiple Transform Selection (MTS) scheme is used for residual coding both inter and intra coded blocks. It uses multiple selected transforms from the DCT8/discrete sine transform (DST) 7. The newly introduced transform matrices are DST-VII and DCT-VIII. The table below shows the basis functions of the selected DST/DCT.

| Transform Type | Basis function $T_i(j)$, $i, j = 0, 1, \ldots, N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ <br><br> where, $\omega_0 = \begin{cases} \sqrt{\dfrac{2}{N}} & i = 0 \\ 1 & i \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at SPS level for intra and inter, respectively. When MTS is enabled at SPS, a coding unit (CU) level flag is signalled to indicate whether MTS is applied or not. Here, MTS is applied only for luma. The MTS CU level flag is signalled when the following conditions are satisfied:
  Both width and height smaller than or equal to 32;
  Coded block flag (CBF) flag is equal to one.
  If MTS CU flag is equal to zero, then DCT2 is applied in both directions. However, if MTS CU flag is equal to one, then two other flags are additionally signalled to indicate the transform type for the horizontal and vertical directions, respectively. Transform and signalling mapping table as shown in Table 3. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 3

Example mapping of decoded value of tu_mts_idx and corresponding transform matrices for the horizontal and vertical directions.

| | | | Intra/inter | |
|---|---|---|---|---|
| MTS_CU_flag | MTS_Hor_flag | MTS_Ver_flag | Horizontal | Vertical |
| 0 | | | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

In addition to the cases wherein different transforms are applied, VVC also supports a mode called transform skip (TS) which is like the concept of TS in the HEVC. TS is treated as a special case ofuMTS.

2.7.1.1 Example Syntax and Semantics

MTS index may be signalled in the bitstream and such a design is called explicit MTS. In addition, an alternative way which directly derive the matrix according to transform block sizes is also supported, as implicit MTS.

For the explicit MTS, it supports all coded modes. While for the implicit MTS, only intra mode is supported.

The portions below in bold and underlines indicate proposed modifications to the standard.

7.3.2.4 Picture Parameter Set RBSP Syntax

|  | Descriptor |
|---|---|
| pic_parameter_set_rbsp( ) { | |
|   pps_pic_parameter_set_id | ue(v) |
|   pps_seq_parameter_set_id | ue(v) |
|   output_flag_present_flag | u(1) |
|   single_tile_in_pic_flag | u(1) |
|   ... | |
|   init_qp_minus26 | se(v) |
|   transform_skip_enabled_flag | u(1) |
|   if( transform_skip_enabled_flag ) | |
|     log2_transform_skip_max_size_minus2 | ue(v) |
|   cu_qp_delta_enabled_flag | u(1) |
|   if( cu_qp_delta_enabled_flag ) | |
|     cu_qp_delta_subdiv | ue(v) |
|   pps_cb_qp_offset | se(v) |
|   pps_cr_qp_offset | se(v) |
|   pps_slice_chroma_qp_offsets_present_flag | u(1) |
|   weighted_pred_flag | u(1) |
|   weighted_bipred_flag | u(1) |
|   deblocking_filter_control_present_flag | u(1) |
|   if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|     } | |
|   } | |
|   pps_loop_filter_across_virtual_boundaries_disabled_flag | u(1) |
|   if( pps_loop_filter_across_virtual_boundaries_disabled_flag ) { | |
|     pps_num_ver_virtual_boundaries | u(2) |
|     for( i = 0; i < pps_num_ver_virtual_boundaries; i++ ) | |
|       pps_virtual_boundaries_pos_x[ i ] | u(v) |
|     pps_num_hor_virtual_boundaries | u(2) |
|     for( i = 0; i < pps_num_hor_virtual_boundaries; i++ ) | |
|       pps_virtual_boundaries_pos_y[ i ] | u(v) |
|   } | |
|   pps_extension_flag | u(1) |
|   if( pps_extension_flag ) | |
|     while( more_rbsp_data( ) ) | |
|       pps_extension_data_flag | u(1) |
|   rbsp_trailing_bits( ) | |
| } | |

7.3.7.10 Transform Unit Syntax

|  | Descriptor |
|---|---|
| transform_unit( x0, y0, tbWidth, tbHeight, treeType, subTuIndex ) { | |
|   ... | |
|   if( ( tu_cbf_luma[ x0 ][ y0 ] | | tu_cbf_cb[ x0 ][ y0 ] | | tu_cbf_cr[ x0 ][ y0 ] ) && | |
|     treeType != DUAL_TREE_CHROMA ) { | |
|     if( cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |
|   } | |
|   if( tu_cbf_luma[ x0 ][ y0 ] && treeType != DUAL_TREE_CHROMA | |
|     && ( tbWidth <= 32 ) && ( tbHeight <= 32 ) | |
|     && ( IntraSubPartitionsSplit[ x0 ][ y0 ] = = ISP_NO_SPLIT ) | |
| && ( !cu_sbt_flag ) ) { | |
|     if( transform_skip_enabled_flag && tbWidth <= MaxTsSize && tbHeight <= MaxTsSize ) | |
|       transform_skip_flag[ x0 ][ y0 ] | ae(v) |
|     if( ( ( CuPredMode[ x0 ][ y0 ] != MODE_INTRA && | |
| sps_explicit_mts_inter_enabled_flag ) | |
|       **| | ( CuPredMode[ x0 ][ y0 ] = = MODE_INTRA &&** | |
| sps_explicit_mts_intra_enabled_flag )) | |
|       && ( tbWidth <= 32 ) && ( tbHeight <= 32 ) && | |
| ( !transform_skip_flag[ x0 ][ y0 ] ) ) | |

-continued

| | Descriptor |
|---|---|
| tu_mts_idx[ x0 ][ y0 ] | ae(v) |

```
    }
    if( tu_cbf_luma[ x0 ][ y0 ] )
        residual_coding( x0, y0, Log2( tbWidth ), Log2( tbHeight ), 0 )
    if( tu_cbf_cb[ x0 ][ y0 ] )
        residual_coding( xC, yC, Log2( wC ), Log2( hC ), 1 )
    if( tu_cbf_cr[ x0 ][ y0 ] )
        residual_coding( xC, yC, Log2( wC ), Log2( hC ), 2 )
}
``` transform_skip_flag[x0][y0] specifies whether a transform is applied to the luma transform block or not. The array indices x0, y0 specify the location (x0, y0) of the top-left luma sample of the considered transform block relative to the top-left luma sample of the picture. transform_skip_flag[x0][y0] equal to 1 specifies that no transform is applied to the luma transform block. transform_skip_flag[x0][y0] equal to 0 specifies that the decision whether transform is applied to the luma transform block or not depends on other syntax elements. When transform_skip_flag[x0][y0] is not present, it is inferred to be equal to 0.

tu_mts_idx[x0][y0] specifies which transform kernels are applied to the residual samples along the horizontal and vertical direction of the associated luma transform block. The array indices x0, y0 specify the location (x0, y0) of the top-left luma sample of the considered transform block relative to the top-left luma sample of the picture.
When tu_mts_idx[x0][y0] is not present, it is inferred to be equal to 0.
In the CABAC decoding process, one context is used to decode transform_skip_flag, truncated unary is used to binarize the tu_mts_idx. Each bin of the tu_mts_idx is context coded, and for the first bin, the quad-tree depth (e.g., cqtDepth) is used to select one context; and for the remaining bins, one context is used.

TABLE 9-15

Assignment of ctxInc to syntax elements with context coded bins

| | binIdx | | | | | |
|---|---|---|---|---|---|---|
| Syntax element | 0 | 1 | 2 | 3 | 4 | >= 5 |
| transform_skip_flag[ ][ ] | 0 | na | na | na | Na | na |
| tu_mts_idx[ ][ ] | cqtDepth | 6 | 7 | 8 | Na | na |

2.7.2 Implicit Multiple Transform Set (MTS)
It is noted that ISP, SBT, and MTS enabled but with implicit signalling are all treated as implicit MTS. The implicitMtsEnabled is used to define whether implicit MTS is enabled.
8.7.4 Transformation process for scaled transform coefficients
8.7.4.1 General
The variable implicitMtsEnabled is derived as follows:
   If sps_mts_enabled_flag is equal to 1 and one of the following conditions is true, implicitMtsEnabled is set equal to 1:
      IntraSubPartitionsSplitType is not equal to ISP_NO_SPLIT
      cu_sbt_flag is equal to 1 and Max(nTbW, nTbH) is less than or equal to 32 sps_explicit_mts_intra_enabled_flag and sps_explicit_mts_inter_enabled_flag are both equal to 0 and CuPredMode[xTbY][yTbY] is equal to MODE_INTRA
   Otherwise, implicitMtsEnabled is set equal to 0.
The variable trTypeHor specifying the horizontal transform kernel and the variable trTypeVer specifying the vertical transform kernel are derived as follows:
   If cIdx is greater than 0, trTypeHor and trTypeVer are set equal to 0.
   Otherwise, if implicitMtsEnabled is equal to 1, the following applies:
      If IntraSubPartitionsSplitType is not equal to ISP_NO_SPLIT, trTypeHor and trTypeVer are specified in Table 8-15 depending on intraPredMode.
      Otherwise, if cu_sbt_flag is equal to 1, trTypeHor and trTypeVer are specified in Table 8-14 depending on cu_sbt_horizontal_flag and cu_sbt_pos_flag.
      Otherwise (sps_explicit_mts_intra_enabled_flag and sps_explicit_mts_inter_enabled_flag are equal to 0), trTypeHor and trTypeVer are derived as follows:
        trTypeHor=(nTbW>=4 && nTbW<=16 && nTbW<=nTbH)?1:0 (8-1030)
        trTypeVer=(nTbH>=4 && nTbH<=16 && nTbH<=nTbW)?1:0 (8-1031)
   Otherwise, trTypeHor and trTypeVer are specified in Table 8-13 depending on tu_mts_idx[xTbY][yTbY].

TABLE 8-13

Specification of trTypeHor and trTypeVer depending on tu_mts_idx[ x ][ y ]

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

TABLE 9-14

Specification of trTypeHor and trTypeVer depending on cu_sbt_horizontal_flag and cu_sbt_pos_flag

| cu_sbt_horizontal_flag | cu_sbt_pos_flag | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

Figure 10:
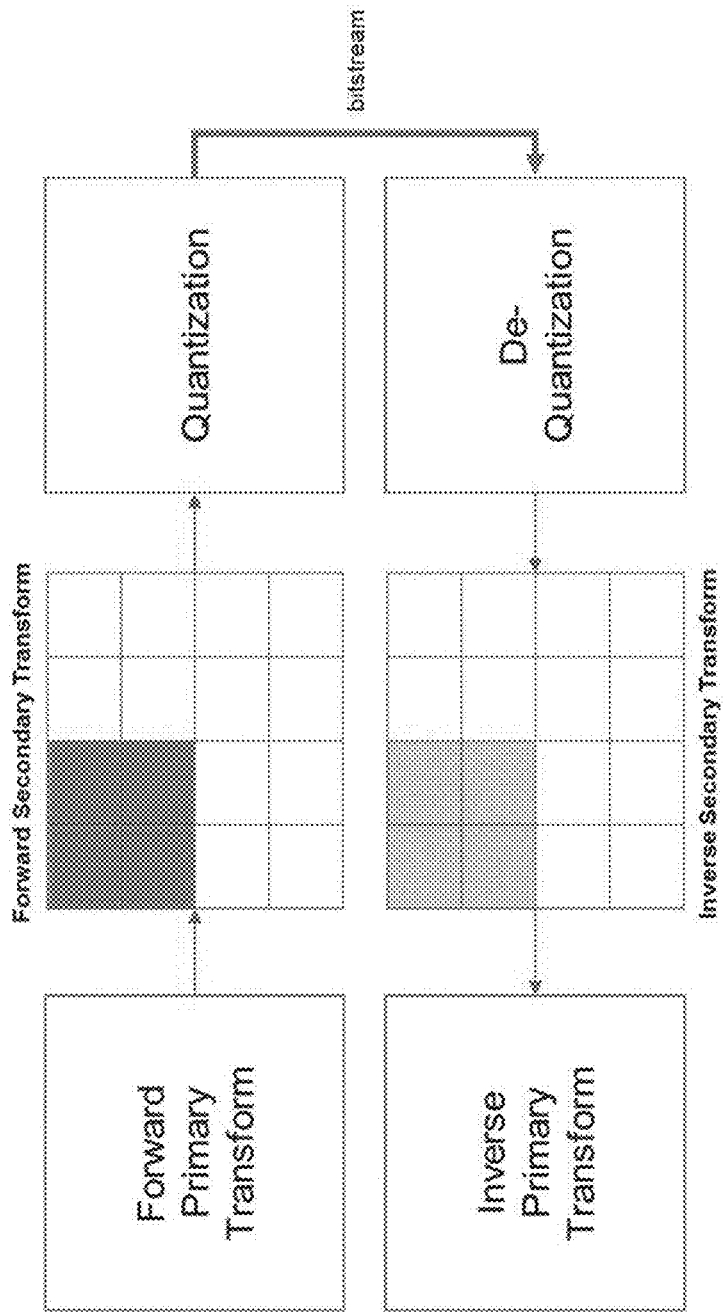
FIG. 10 shows an example of secondary transform in Joint Exploration Model (JEM).

2.8 Reduced Secondary Transform (RST)
2.8.1 Non-Separable Secondary Transform (NSST)
In some embodiments, secondary transform is applied between forward primary transform and quantization (at encoder) and between de-quantization and invert primary transform (at decoder side). As shown in FIG. 10, a 4×4 (or 8×8) secondary transform is performed depends on block size. For example, 4×4 secondary transform is applied for small blocks (e.g., min (width, height)<8) and 8×8 secondary transform is applied for larger blocks (e.g., min (width, height)>4) per 8×8 block.

Application of a non-separable transform is described as follows using input as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is first represented as a vector $\vec{X}$ :

$\vec{X} = [X_{00}\ X_{01}\ X_{02}\ X_{03}\ X_{10}\ X_{11}\ X_{12}\ X_{13}\ X_{20}\ X_{21}\ X_{22}\ X_{23}\ X_{30}\ X_{31}\ X_{32}\ X_{33}]^T$ The non-separable transform is calculate as $\vec{F} = T\vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block. There are totally 35 transform sets and 3 non-separable transform matrices (kernels) per transform set are used. The mapping from the intra prediction mode to the transform set is pre-defined. For each transform set, the selected non-separable secondary transform candidate is further specified by the explicitly signalled secondary transform index. The index is signalled in a bit-stream once per Intra CU after transform coefficients.

2.8.2 Example Reduced Secondary Transform (RST)

Figure 11:
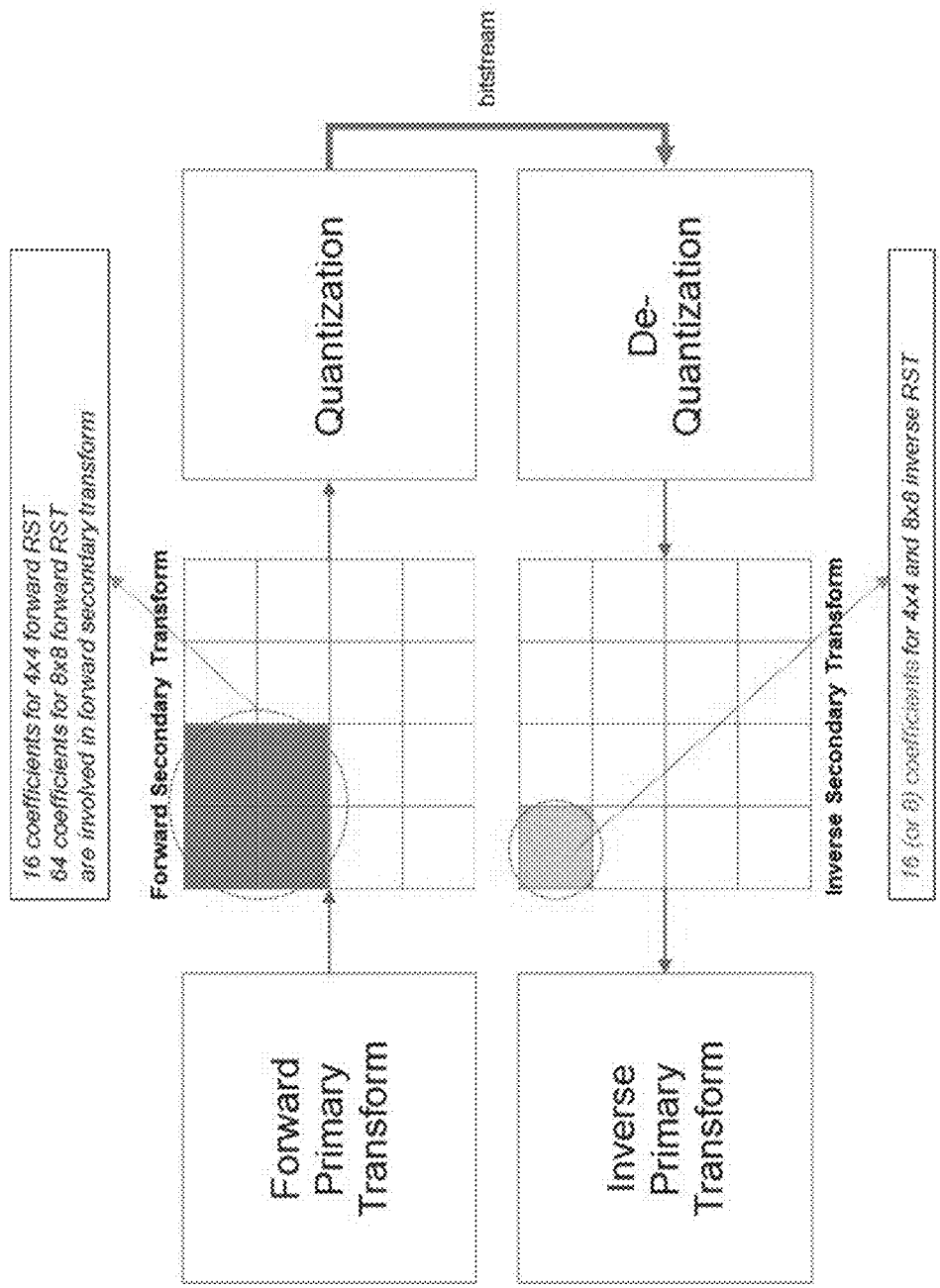
FIG. 11 shows an example of the proposed Reduced Secondary Transform (RST).

In some embodiments, the RST uses 4 transform set (instead of 35 transform sets) mapping. In some embodiments, 16×64 (may further be reduced to 16×48) and 16×16 matrices can be employed for 8×8 and 4×4 blocks, respectively. For notational convenience, the 16×64 (may further be reduced to 16×48) transform is denoted as RST8×8 and the 16×16 one as RST4×4. FIG. 11 shows an example of the proposed Reduced Secondary Transform (RST).

2.9 Sub-Block Transform

For an inter-predicted CU with cu_cbf equal to 1, cu_sbt_flag may be signalled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out. The SBT is not applied to the combined inter-intra mode.

Figure 12:
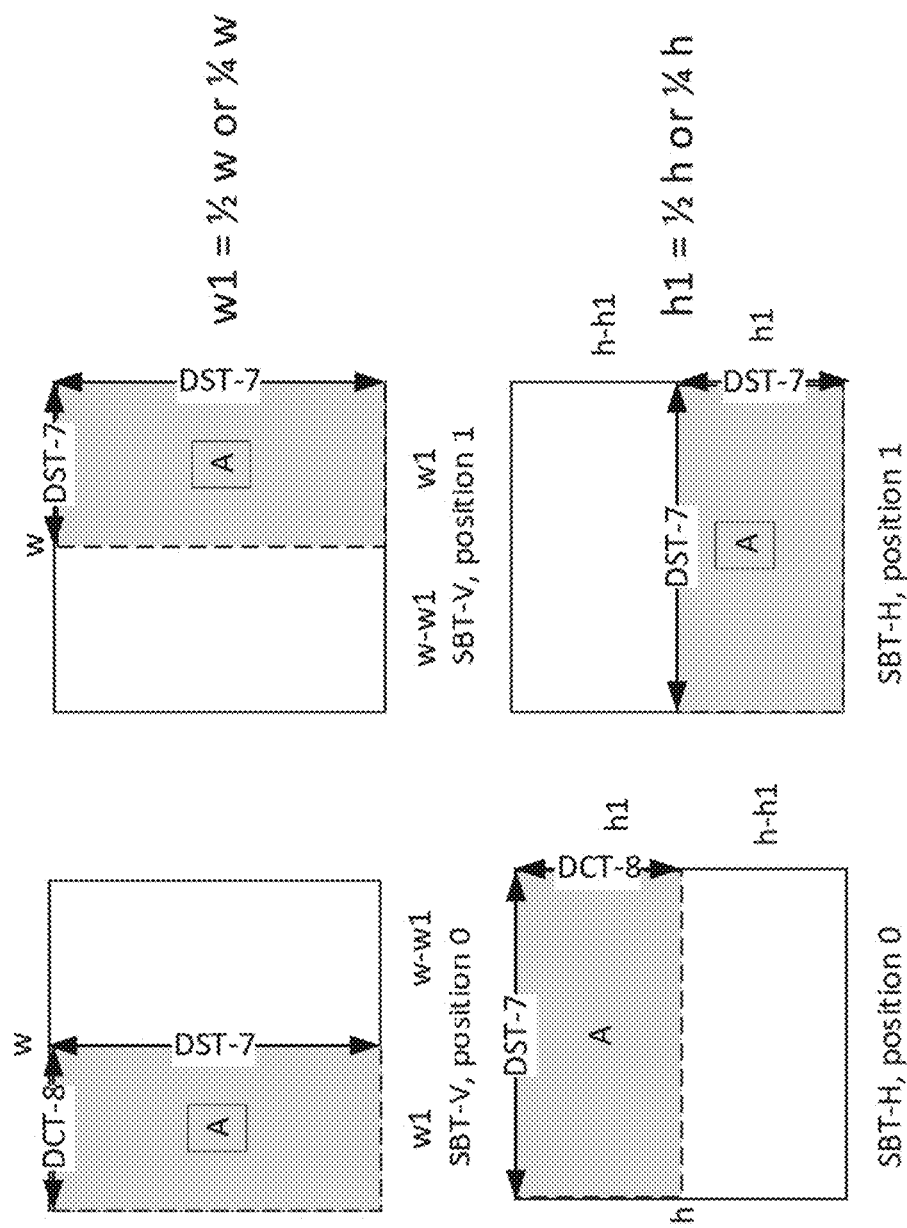
FIG. 12 is an illustration of sub-block transform modes subblock transform (SBT) vertical (SBT-V) and SBT-horizontal (SBT-H).

In sub-block transform, position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 12. For example, the horizontal and vertical transforms for SBT-V position 0 is DCT-8 and DST-7, respectively. When one side of the residual transform unit (TU) is greater than 32, the corresponding transform is set as DCT-2. Therefore, the sub-block transform jointly specifies the TU tiling, cbfCBF and horizontal and vertical transforms of a residual block, which may be considered a syntax shortcut for the cases that the major residual of a block is at one side of the block.

2.9.1 Example Syntax and Semantics

The portions below in bold and underlines indicate proposed modifications to the standard.

7.3.7.5 Coding Unit Syntax

|  | Descriptor |
|---|---|
| coding_unit( x0, y0, cbWidth, cbHeight, treeType ) { | |
|   if( slice_type != I \| \| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && slice_type != I ) | |
|       pred_mode_flag | ae(v) |
|     if( ( ( slice_type = = I && cu_skip_flag[ x0 ][ y0 ] = =0 ) \| \| | |
|      ( slice_type != I && CuPredMode[ x0 ][ y0 ] != MODE_INTRA ) ) | |
| &&  | |
|     sps_ibc_enabled_flag ) | |
|       pred_mode_ibc_flag | ae(v) |
|   } | |
|   if( CuPredMode[ x0 ][ y0 ] = = MODE_INTRA ) { | |
|   ... | |
|   } | |
|   } else if( treeType != DUAL_TREE_CHROMA ) { /* MODE_INTER or MODE_IBC */ | |
|   ... | |
|   } | |
|   } | |
|   if( !pcm_flag[ x0 ][ y0 ] ) { | |
|     if( CuPredMode[ x0 ][ y0 ] != MODE_INTRA && merge_flag[ x0 ][ y0 ] = = 0 ) | |
|       cu_cbf | ae(v) |
|     if( cu_cbf ) { | |
|       if( CuPredMode[ x0 ][ y0 ] = = MODE_INTER && sps_sbt_enabled_flag && | |
|         !ciip_flag[ x0 ][ y0 ] ) { | |
|         if( cbWidth <= MaxSbtSize && cbHeight <= MaxSbtSize ) { | |
|           allowSbtVerH = cbWidth >= 8 | |
|           allowSbtVerQ = cbWidth >= 16 | |

-continued

|  | Descriptor |
|---|---|
|         allowSbtHorH = cbHeight >= 8<br>        allowSbtHorQ = cbHeight >= 16<br>        if( allowSbtVerH \|\| allowSbtHorH \|\| allowSbtVerQ \|\|<br>allowSbtHorQ )<br>           cu_sbt_flag<br>        }<br>        if( cu_sbt_flag ) {<br>          if( ( allowSbtVerH \|\| allowSbtHorH ) && ( allowSbtVerQ<br>\|\| allowSbtHorQ) )<br>            cu_sbt_quad_flag<br>          if( ( cu_sbt_quad_flag && allowSbtVerQ && allowSbtHorQ<br>) \|\|<br>           ( !cu_sbt_quad_flag && allowSbtVerH && allowSbtHorH<br>) )<br>           cu_sbt_horizontal_flag<br>          cu_sbt_pos_flag<br>        }<br>      }<br>      transform_tree( x0, y0, cbWidth, cbHeight, treeType )<br>    }<br>  }<br>} | <br><br><br><br>ae(v)<br><br><br><br><br>ae(v)<br><br><br><br><br>ae(v)<br>ae(v) |

7.3.7.11 Residual Coding Syntax

|  | Descriptor |
|---|---|
| residual_coding( x0, y0, log2TbWidth, log2TbHeight, cIdx ) {<br>  if( ( tu_mts_idx[ x0 ][ y0 ] > 0 \|\|<br>     ( cu_sbt_flag && log2TbWidth < 6 && log2TbHeight < 6 ) )<br>     && cIdx == 0 && log2TbWidth > 4 )<br>    log2TbWidth = 4<br>  else<br>    log2TbWidth = Min( log2TbWidth, 5 )<br>  if( tu_mts_idx[ x0 ][ y0 ] > 0 \|\|<br>     ( cu_sbt_flag && log2TbWidth < 6 && log2TbHeight < 6 ) )<br>     && cIdx == 0 && log2TbHeight > 4 )<br>    log2TbHeight = 4<br>  Else<br>    log2TbHeight = Min( log2TbHeight, 5 )<br>  if( log2TbWidth > 0 )<br>    last_sig_coeff_x_prefix<br>  if( log2TbHeight > 0 )<br>    last_sig_coeff_y_prefix<br>  if( last_sig_coeff_x_prefix > 3 )<br>    last_sig_coeff_x_suffix<br>  if( last_sig_coeff_y_prefix > 3 )<br>    last_sig_coeff_y_suffix<br>  log2SbW = ( Min( log2TbWidth, log2TbHeight ) < 2 ? 1 : 2 )<br>  log2SbH = log2SbW<br>  if ( log2TbWidth < 2 && cIdx == 0 ) {<br>    log2SbW = log2TbWidth<br>    log2SbH = 4 − log2SbW<br>  } else if ( log2TbHeight < 2 && cIdx == 0 ) {<br>    log2SbH = log2TbHeight<br>    log2SbW = 4 − log2SbH<br>  }<br>  numSbCoeff = 1 << ( log2SbW + log2SbH )<br>  lastScanPos = numSbCoeff<br>  lastSubBlock = ( 1 << (<br>log2TbWidth + log2TbHeight − ( log2SbW + log2SbH ) ) ) − 1<br>...<br>} | <br><br><br><br><br><br><br><br><br><br><br><br><br><br>ae(v)<br><br>ae(v)<br><br>ae(v)<br><br>ae(v) | sps_sbt_max_size_64_flag equal to 0 specifies that the maximum CU width and height for allowing subblock transform is 32 luma samples. sps_sbt_max_size_64_flag equal to 1 specifies that the maximum CU width and height for allowing subblock transform is 64 luma samples.

MaxSbtSize=sps_sbt_max_size_64_flag?64:32.

2.10 Most-Probable-Mode (MPM) List for Intra Mode Coding

Figure 13:
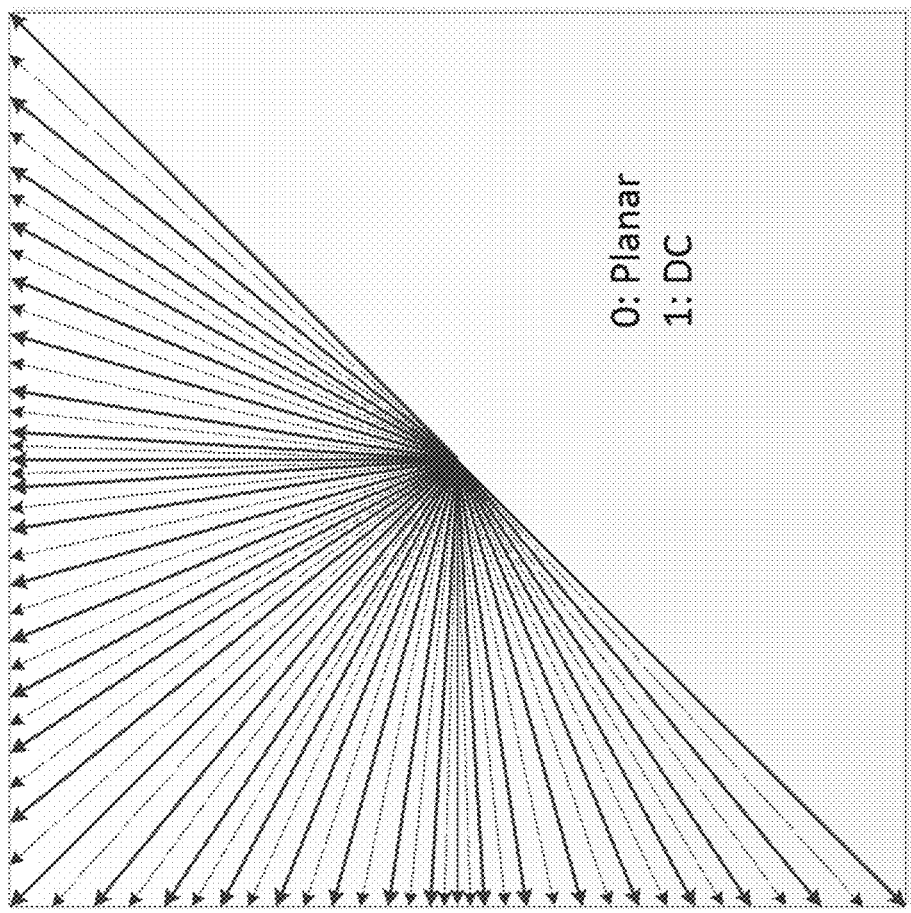
FIG. 13 shows another example of 67 intra prediction modes.

To capture the arbitrary edge directions presented in natural video, the number of directional intra modes in VTM4 is extended from 33, as used in HEVC, to 65. FIG. 13 shows another example of 67 intra prediction modes. The new directional modes not in HEVC are depicted as dotted arrows in FIG. 13, and the planar and DC modes remain the same. These denser directional intra prediction modes apply for all block sizes and for both luma and chroma intra predictions.

Figure 14:
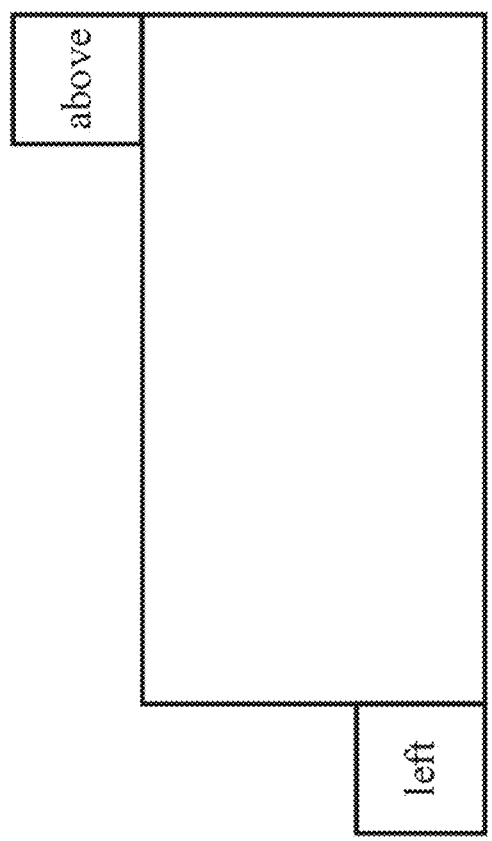
FIG. 14 shows an example of left and above neighbours of the current block.

A unified 6-MPM list is proposed for intra blocks irrespective of whether MRL and ISP coding tools are applied or not. FIG. 14 shows an example of left and above neighbours of the current block. The MPM list is constructed based on intra modes of the left and above neighbouring block as in VTM4.0, as shown in FIG. 14.

Suppose the mode of the left is denoted as Left and the mode of the above block is denoted as Above, the unified MPM list is constructed as with the following steps in order:

When the intra prediction mode of a neighbouring block is invalid, its intra mode is set to Planar by default.

If Left and Above are the same and both angular:
MPM list→{Planar, Left, Left −1, Left +1, DC, Left −2}

If Left and Above are different and both angular:
Set a mode Max as the larger mode in Left and Above
if the difference of mode Left and Above is in the range of 2 to 62, inclusive: MPM list→{Planar, Left, Above, DC, Max −1, Max +1}
Otherwise: MPM list→{Planar, Left, Above, DC, Max −2, Max +2}

If Left and Above are different and one of modes Left and Above is angular mode, and the other is non-angular:
Set a mode Max as the larger mode in Left and Above
MPM list→{Planar, Max, DC, Max −1, Max +1, Max −2}

If both modes Left and Above are non-angular modes:
MPM list→{Planar, DC, V, H, V−4, V+4}

Note that when the mode index (e.g., Max+2) exceed the range [0, 66], it may be replaced by another valid mode index.

The first MPM candidate, e.g., the Planar mode is signalled separately from the remaining MPM candidates.

The more detailed syntax, semantics and decoding process are described as follows. The portions below in bold and underlines indicate proposed modifications to the standard.

7.3.6.5 Coding Unit Syntax

| | Descriptor |
|---|---|
| coding_unit( x0, y0, cbWidth, cbHeight, treeType ) { | |
|   if( tile_group_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && tile_group_type != I ) | |
|       pred_mode_flag | ae(v) |
|     if( ( ( tile_group_type = = I && cu_skip_flag[ x0 ][ y0 ] = =0 ) \|\| | |
|     ( tile_group_type != I && CuPredMode[ x0 ][ y0 ] != MODE_INTRA ) ) && | |
|     sps_ibc_enabled_flag ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \|\| treeType = = DUAL_TREE_LUMA ) { | |
|         if( ( y0 % CtbSizeY ) > 0 ) | |
|           intra_luma_ref_idx[ x0 ][ y0 ] | ae(v) |
|         if (intra_luma_ref_idx[ x0 ][ y0 ] == 0 && | |
|           ( cbWidth <= MaxTbSizeY \|\| cbHeight <= MaxTbSizeY ) && | |
|           **( cbWidth * cbHeight > MinTbSizeY * MinTbSizeY ))** | |
|           intra_subpartitions_mode_flag[ x0 ][ y0 ] | ae(v) |
|         if( intra_subpartitions_mode_flag[ x0 ][ y0 ] = = 1 && | |
|           cbWidth <= MaxTbSizeY && cbHeight <= MaxTbSizeY ) | |
|           intra_subpartitions_split_flag[ x0 ][ y0 ] | ae(v) |
|         if( intra_luma_ref_idx[ x0 ][ y0 ] = = 0 && | |
|           intra_subpartitions_mode_flag[ x0 ][ y0 ] = = 0 ) | |
|           intra_luma_mpm_flag[ x0 ][ y0 ] | ae(v) |
|         if( intra_luma_mpm_flag[ x0 ][ y0 ] ) { | |
|           if( intra_luma_ref_idx[ x0 ][ y0 ] = = 0 ) | |
|             intra_luma_not_planar_flag[x0 ][y0 ] | ae(v) |
|           if( intra_luma_not_planar_flag[ x0 ][ y0 ]) | |
|             intra_luma_mpm_idx[ x0 ][ y0 ] | ae(v) |

-continued

| | Descriptor |
|---|---|
| `        } else` | |
| `            ``intra_luma_mpm_remainder[ x0 ][ y0 ]` | ae(v) |
| `        }` | |
| `        if( treeType = = SINGLE_TREE || treeType = =` | |
| `DUAL_TREE_CHROMA )` | |
| `            ``intra_chroma_pred_mode[ x0 ][ y0 ]` | ae(v) |
| `    }` | |
| `  } else if( treeType != DUAL_TREE_CHROMA ) { /* MODE_INTER or` | |
| `MODE_IBC */` | |
| `    ...` | |
| `  }` | |
| `  if( !pcm_flag[ x0 ][ y0 ] ) {` | |
| `    if( CuPredMode[ x0 ][ y0 ] != MODE_INTRA &&` | |
| `merge_flag[ x0 ][ y0 ] = = 0 )` | |
| `        ``cu_cbf` | ae(v) |
| `    if( cu_cbf ) {` | |
| `        if( CuPredMode[ x0 ][ y0 ] = = MODE_INTER &&` | |
| `sps_sbt_enabled_flag &&` | |
| `            !ciip_flag[ x0 ][ y0 ] ) {` | |
| `            if( cbWidth <= MaxSbtSize && cbHeight <= MaxSbtSize ) {` | |
| `                allowSbtVerH = cbWidth >= 8` | |
| `                allowSbtVerQ = cbWidth >=16` | |
| `                allowSbtHorH = cbHeight >= 8` | |
| `                allowSbtHorQ = cbHeight >=16` | |
| `                if( allowSbtVerH || allowSbtHorH || allowSbtVerQ ||` | |
| `allowSbtHorQ )` | |
| `                    ``cu_sbt_flag` | ae(v) |
| `            }` | |
| `            if( cu_sbt_flag ) {` | |
| `                if( ( allowSbtVerH || allowSbtHorH ) && ( allowSbtVerQ ||` | |
| `allowSbtHorQ) )` | |
| `                    ``cu_sbt_quad_flag` | ae(v) |
| `                if( ( cu_sbt_quad_flag && allowSbtVerQ && allowSbtHorQ ) ||` | |
| `                    ( !cu_sbt_quad_flag && allowSbtVerH && allowSbtHorH ) )` | |
| `                    ``cu_sbt_horizontal_flag` | ae(v) |
| `                ``cu_sbt_pos_flag` | ae(v) |
| `            }` | |
| `        }` | |
| `        transform_tree( x0, y0, cbWidth, cbHeight, treeType )` | |
| `    }` | |
| `  }` | |
| `}` | |

The syntax elements intra_luma_mpm_flag[x0][y0], intra_luma_not_planar_flag[x0][y0], intra_luma_mpm_idx [x0][y0] and intra_luma_mpm_remainder[x0][y0] specify the intra prediction mode for luma samples. The array indices x0, y0 specify the location (x0, y0) of the top-left luma sample of the considered coding block relative to the top-left luma sample of the picture. When intra_luma_mpm_flag[x0][y0] is equal to 1, the intra prediction mode is inferred from a neighbouring intra-predicted coding unit according to clause 8.4.2 described in section 4.1.
When intra_luma_mpm_flag[x0][y0] is not present (e.g., ISP enabled, or MRL enabled (with reference index >0)), it is inferred to be equal to 1.
When intra_luma_not_planar_flag[x0][y0] is not present (e.g., MRL is enabled), it is inferred to be equal to 1.

intra_luma_not_planar_flag is contexted coded and the context selection is based on whether the current block is not coded with ISP mode or not (e.g., !intra_subpartitions_mode_flag).
intra_luma_mpm_idx is bypass coded without contexts.
8.4.2 Derivation Process for Luma Intra Prediction Mode
Input to this Process are:
    a luma location (xCb, yCb) specifying the top-left sample of the current luma coding block relative to the top left luma sample of the current picture,
    a variable cbWidth specifying the width of the current coding block in luma samples,
    a variable cbHeight specifying the height of the current coding block in luma samples.
In this process, the luma intra prediction mode IntraPredModeY[xCb][yCb] is derived.

TABLE 8-1

Specification of intra prediction mode and associated names

| Intra prediction mode | Associated name |
|---|---|
| 0 | INTRA_PLANAR |
| 1 | INTRA_DC |

TABLE 8-1-continued

Specification of intra prediction mode and associated names

| Intra prediction mode | Associated name |
|---|---|
| 2 ... 66 | INTRA_ANGULAR2 ... INTRA_ANGULAR66 |
| 81 ... 83 | INTRA_LT_CCLM, INTRA_L_CCLM, INTRA_T_CCLM |

Noted:
the intra prediction modes INTRA_LT_CCLM, INTRA_L_CCLM and INTRA_T_CCLM are only applicable to chroma components.

IntraPredModeY[xCb][yCb] is derived as follows:
  If intra_luma_not_planar_flag[xCb][yCb] is equal to 1, the following ordered steps:
  1. The neighbouring locations (xNbA, yNbA) and (xNbB, yNbB) are set equal to (xCb−1, yCb+cbHeight−1) and (xCb+cbWidth−1, yCb−1), respectively.
  2. For X being replaced by either A or B, the variables candIntraPredModeX are derived as follows:
     The availability derivation process for a block as specified in clause 6.4.X [Ed. (BB): Neighbouring blocks availability checking process tbd] is invoked with the location (xCurr, yCurr) set equal to (xCb, yCb) and the neighbouring location (xNbY, yNbY) set equal to (xNbX, yNbX) as inputs, and the output is assigned to availableX.
     The candidate intra prediction mode candIntraPredModeX is derived as follows:
       If one or more of the following conditions are true, candIntraPredModeX is set equal to INTRA_PLANAR.
         The variable availableX is equal to FALSE.
         CuPredMode[xNbX][yNbX] is not equal to MODE_INTRA and ciip_flag[xNbX][yNbX] is not equal to 1.
         pcm_flag[xNbX][yNbX] is equal to 1.
         X is equal to B and yCb−1 is less than ((yCb>>CtbLog2SizeY)<<CtbLog2SizeY).
       Otherwise, candIntraPredModeX is set equal to IntraPredModeY[xNbX][yNbX].
  3. The candModeList[x] with x=0.4 is derived as follows:
     If candIntraPredModeB is equal to candIntraPredModeA and candIntraPredModeA is greater than INTRA_DC, candModeList[x] with x=0.4 is derived as follows:

candModeList[0]=candIntraPredModeA            (8-10)

candModeList[1]=2+((candIntraPredModeA+61)%64)   (8-12)

candModeList[2]=2+((candIntraPredModeA−1)%64)    (8-13)

candModeList[3]=INTRA_DC                       (8-11)

candModeList[4]=2+((candIntraPredModeA+60)%64)   (8-14)

Otherwise if candIntraPredModeB is not equal to candIntraPredModeA and candIntraPredModeA or candIntraPredModeB is greater than INTRA_DC, the following applies:
       The variables minAB and maxAB are derived as follows:

minAB=Min(candIntraPredModeA,candIntraPredModeB)   (8-24)

maxAB=Max(candIntraPredModeA,candIntraPredModeB)   (8-25)

If candIntraPredModeA and candIntraPredModeB are both greater than INTRA_DC, candModeList[x] with x=0 ... 4 is derived as follows:

candModeList[0]=candIntraPredModeA            (8-27)

candModeList[1]=candIntraPredModeB            (8-29)

candModeList[2]=INTRA_DC                      (8-29)

If maxAB−minAB is in the range of 2 to 62, inclusive, the following applies:

candModeList[3]=2+((maxAB+61)%64)           (8-30)

candModeList[4]=2+((maxAB−1)%64)            (8-31)

Otherwise, the following applies:

candModeList[3]=2+((maxAB+60)%64)           (8-32)

candModeList[4]=2+((maxAB)%64)              (8-33)

Otherwise (candIntraPredModeA or candIntraPredModeB is greater than INTRA_DC), candModeList[x] with x=0.4 is derived as follows:

candModeList[0]=maxAB                         (8-65)

candModeList[1]=INTRA_DC                      (8-66)

candModeList[2]=2+((maxAB+61)%64)             (8-66)

candModeList[3]=2+((maxAB−1)%64)              (8-67)

candModeList[4]=2+((maxAB+60)%64)             (8-68)

Otherwise, the following applies:

candModeList[0]=INTRA_DC                      (8-71)

candModeList[1]=INTRA_ANGULAR50               (8-72)

candModeList[2]=INTRA_ANGULAR18               (8-73)

candModeList[3]=INTRA_ANGULAR46               (8-74)

candModeList[4]=INTRA_ANGULAR54               (8-75)

4. IntraPredModeY[xCb][yCb] is derived by applying the following procedure:
     If intra_luma_mpm_flag[xCb][yCb] is equal to 1, the IntraPredModeY[xCb][yCb] is set equal to candModeList[intra_luma_mpm_idx[xCb][yCb]].
     Otherwise, IntraPredModeY[xCb][yCb] is derived by applying the following ordered steps:
       1. When candModeList[i] is greater than candModeList[j] for i=0 ... 3 and for each i, j=(i+1) ... 4, both values are swapped as follows:

(candModeList[i],candModeList[j])=Swap(candModeList[i],candModeList[j])   (8-94)

2. IntraPredModeY[xCb][yCb] is derived by the following ordered steps:
   i. IntraPredModeY[xCb][yCb] is set equal to intra_luma_mpm_remainder[xCb][yCb].
   ii. The value of IntraPredModeY[xCb][yCb] is incremented by one.
   iii. For i equal to 0 to 4, inclusive, when IntraPredModeY[xCb][yCb] is greater than or equal to candModeList[i], the value of IntraPredModeY[xCb][yCb] is incremented by one.

Otherwise (intra_luma_not_planar_flag[xCb][yCb] is equal to 0), IntraPredModeY[xCb][yCb] is set equal to INTRA_PLANAR.

The variable IntraPredModeY[x][y] with x=xCb . . . xCb+cbWidth−1 and y=yCb . . . yCb+cbHeight−1 is set to be equal to IntraPredModeY[xCb][yCb].

when maximum supported transform length is smaller than the width or height of the colour component of the CU.

Figure 16:
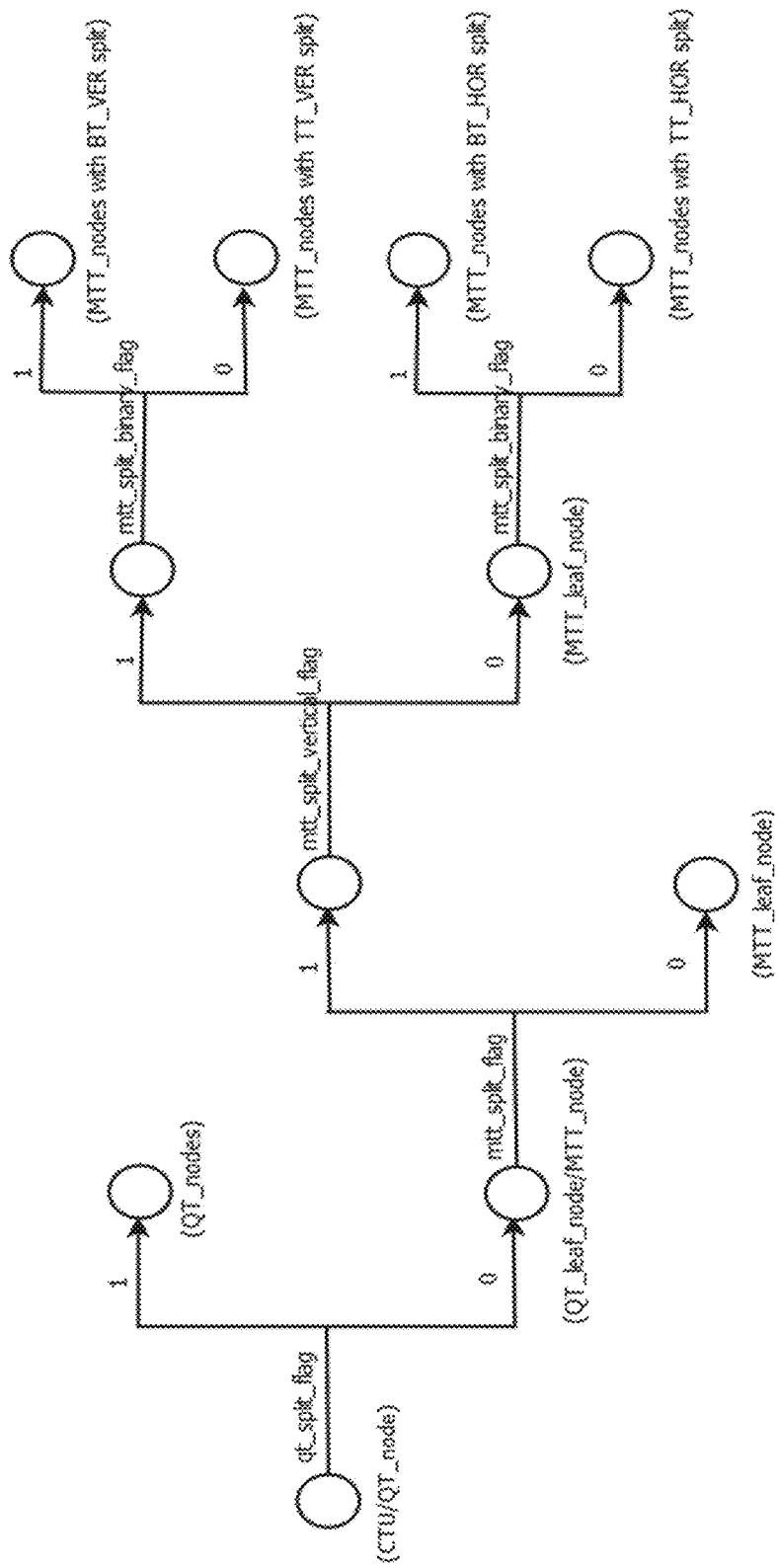
FIG. 16 shows example splitting flags signalling in quadtree with nested multi-type tree coding tree structure.

FIG. 16 illustrates the signalling mechanism of the partition splitting information in quadtree with nested multi-type tree coding tree structure. A coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU is derived as shown in Table 4.

TABLE 4

| MttSplitMode derviation based on multi-type tree syntax elements | | |
|---|---|---|
| MttSplitMode | mtt_split_cu_vertical_flag | mtt_split_cu_binary_flag |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

2.11 Partition Tree

In HEVC, a CTU is split into CUs by using a quaternary-tree structure denoted as coding tree to adapt to various local characteristics. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

Figure 15:
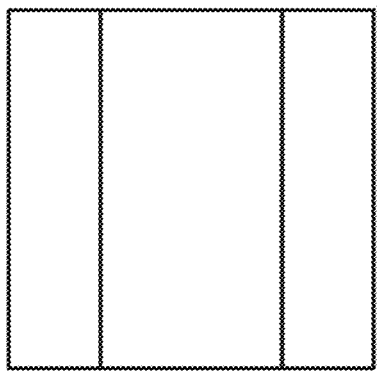
FIG. 15 shows example multi-type tree splitting modes.
Figure 15:
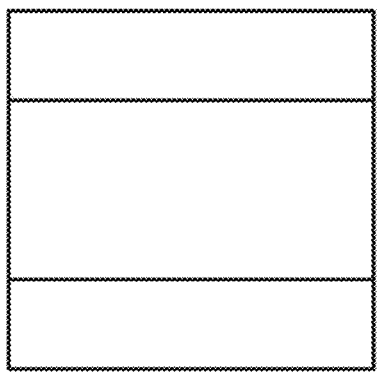
Figure 15:
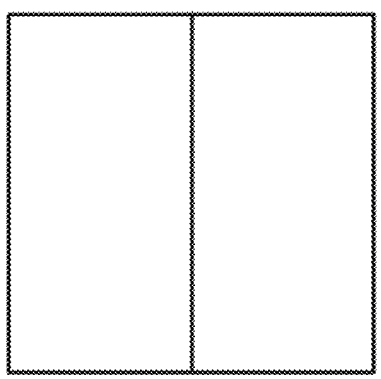
Figure 15:
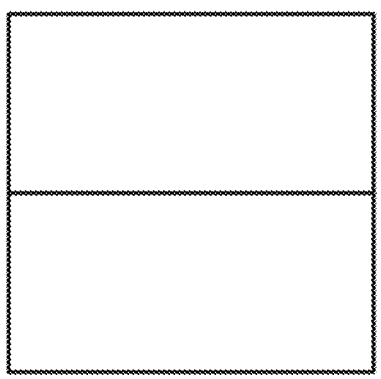
Figure 17:
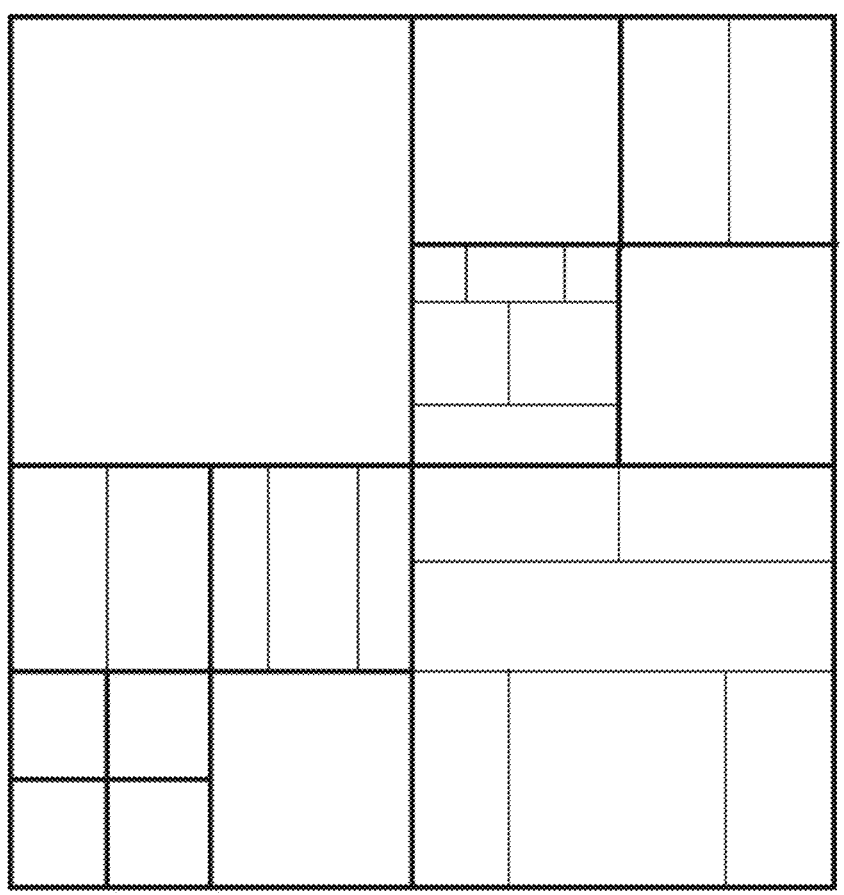
FIG. 17 shows an example of quadtree with nested multi-type tree coding block structure.

In VVC, a quadtree with nested multi-type tree using binary and ternary splits segmentation structure replaces the concepts of multiple partition unit types, e.g. it removes the separation of the CU, PU and TU concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quadtree) structure. Then the quaternary tree leaf nodes can be further partitioned by a multi-type tree structure. As shown in FIG. 15, there are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs FIG. 17 shows a CTU divided into multiple CUs with a quadtree and nested multi-type tree coding block structure, where the bold block edges represent quadtree partitioning and the remaining edges represent multi-type tree partitioning. The quadtree with nested multi-type tree partition provides a content-adaptive coding tree structure comprised of CUs. The size of the CU may be as large as the CTU or as small as 4×4 in units of luma samples. For the case of the 4:2:0 chroma format, the maximum chroma CB size is 64×64 and the minimum chroma CB size is 2×2.

In VVC, the maximum supported luma transform size is 64×64 and the maximum supported chroma transform size is 32×32. When the width or height of the CB is larger the maximum transform width or height, the CB is automatically split in the horizontal and/or vertical direction to meet the transform size restriction in that direction.

The following parameters are defined and specified by SPS syntax elements for the quadtree with nested multi-type tree coding tree scheme.
  CTU size: the root node size of a quaternary tree
  MinQTSize: the minimum allowed quaternary tree leaf node size
  MaxBtSize: the maximum allowed binary tree root node size
  MaxTtSize: the maximum allowed ternary tree root node size
  MaxMttDepth: the maximum allowed hierarchy depth of multi-type tree splitting from a quadtree leaf
  MinBtSize: the minimum allowed binary tree leaf node size
  MinTtSize: the minimum allowed ternary tree leaf node size In one example of the quadtree with nested multi-type tree coding tree structure, the CTU size is set as 128×128 luma samples with two corresponding 64×64 blocks of 4:2:0 chroma samples, the MinQTSize is set as 16×16, the MaxBtSize is set as 128×128 and MaxTtSize is set as 64×64, the MinBtSize and MinTtSize (for both width and height) is set as 4×4, and the MaxMttDepth is set as 4. The quaternary tree partitioning is applied to the CTU first to generate quaternary tree leaf nodes. The quaternary tree leaf nodes may have a size from 16×16 (e.g., the MinQTSize) to 128×128 (e.g., the CTU size). If the leaf quad tree (QT) node is 128×128, it will not be further split by the binary tree since the size exceeds the MaxBtSize and MaxTtSize (e.g., 64×64). Otherwise, the leaf qdtree node could be further partitioned by the multi-type tree. Therefore, the quaternary tree leaf node is also the root node for the multi-type tree and it has multi-type tree depth (mttDepth) as 0. When the multi-type tree depth reaches MaxMttDepth (e.g., 4), no further splitting is considered. When the multi-type tree node has width equal to MinBtSize and smaller or equal to 2*MinTtSize, no further horizontal splitting is considered. Similarly, when the multi-type tree node has height equal to MinBtSize and smaller or equal to 2*MinTtSize, no further vertical splitting is considered.

Figure 18:
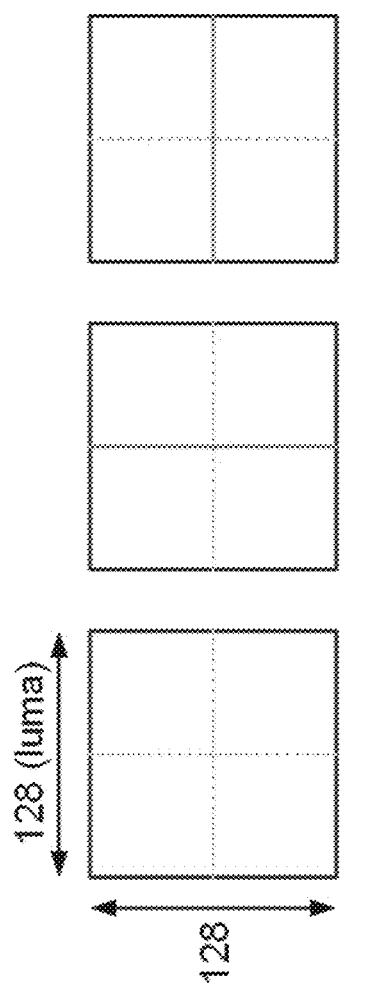
FIG. 18 shows an example split for 128×128 coding block.

To allow 64×64 Luma block and 32×32 Chroma pipelining design in VVC hardware decoders, ternary tree (TT) split is forbidden when either width or height of a luma coding block is larger than 64, as shown in FIG. 18. TT split is also forbidden when either width or height of a chroma coding block is larger than 32.

In VTM3, the coding tree scheme supports the ability for the luma and chroma to have a separate block tree structure. Currently, for P and B slices, the luma and chroma CTBs in one CTU have to share the same coding tree structure. However, for I slices, the luma and chroma can have separate block tree structures. When separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three colour components unless the video is monochrome.

3. Examples Problems

The current design has the following problems:
1. ISP-coded block splits one block to two or four sub-partitions with same intra prediction mode, while one block may be split to two or four partitions and each one may be coded with the same intra prediction modes. Therefore, there are some redundancy existing.
2. In addition, the MPM list construction process uses fixed neighbouring blocks (above and left) which doesn't consider the partition direction. For example, for the horizontal BT, if the above partition is coded with intra mode, the bottom one typically prefers to use a different intra prediction mode, while the intra prediction mode of the above block is included in the MPM list.
3. Some neighbouring samples of inner sub-partitions are always unavailable. For example, for ISP block split in vertical (horizontal) direction, below-left (above-right) neighbouring samples are unavailable.
4. The signalling of intra modes for ALWIP-coded blocks is different from that for other intra-coded blocks using the conventional way, MRL, or ISP.

4. Example Embodiments and Techniques

The listing of embodiments below should be considered as examples to explain general concepts. These embodiments should not be interpreted in a narrow way. Furthermore, these embodiments can be combined in any manner.

Denote one block size by W*H wherein W is the block width and H is the block height. The maximum transform block size denoted by MaxTbW*MaxTbH wherein MaxTbW and MaxTbH are the maximum transform block width and height, respectively. The minimum transform block size denoted by MinTbW*MinTbH wherein MinTbW and MinTbH are the minimum transform block' width and height, respectively. It is noted that MRL may represent those technologies that may use non-adjacent reference lines in current picture to predict the current block, ALWIP may represent those technologies that may use matrix-based intra prediction methods.

Regarding ALWIP and QR-BDPCM:
1. Side information of ALWIP (e.g., on/off usage flag, intra prediction modes, and/or information about the input vector such as whether the input vector for luma samples is transposed or not) may be coded after the side information of QR-BDPCM (e.g., on/off usage flag, and/or prediction direction).
    a. In one example, ALWIP and QR-BDPCM couldn't be applied to one block.
        i. When ALWIP is applied to the block, QR-BDPCM is not applied and its side information is not coded.
        ii. When QR-BDPCM is applied to the block, ALWIP is not applied and its side information is not coded.
        iii. Alternatively, they may be applied to one block wherein the intra prediction method is using the way as ALWIP, and the signalling of residual is following the way of QR-BDPCM, e.g., no transform, coding the residual difference for certain positions within the residual block.
    b. Alternatively, furthermore, whether to signal the side information of ALWIP may depend on the usage of QR-BDPCM.
        i. If QR-BDPCM is applied to one block, the signalling of side information of ALWIP may be skipped.
        ii. If QR-BDPCM is not applied to one block, the side information of ALWIP may still be signalled.
        iii. If QR-BDPCM is applied to one block, the signalling of usage of ALWIP may be signalled while the signalling of ALWIP-modes may be skipped.
        iv. In one example, if QR-BDPCM is applied to one block, the signalling of usage of ALWIP may still be signalled. However, ALWIP should not be applied for the block in a conformance bit-stream.
    c. Alternatively, furthermore, side information of QR-BDPCM may be coded after the side information of ALWIP.
        i. Whether to signal the side information of QR-BDPCM may depend on the usage of ALWIP.
        ii. If ALWIP is applied to one block, the signalling of side information of QR-BDPCM is skipped.
        iii. If ALWIP is applied to one block and the associated ALWIP-mode correspond to the conventional horizontal/vertical modes, usage of QR-BDPCM may be still signalled, however, signalling of the prediction direction (e.g., bdpcm_dir_flag) is skipped.
        iv. In one example, if ALWIP is applied to one block, the usage of QR-BDPCM may be still signalled. However, QR-BDPCM should not be applied for the block in a conformance bit-stream.

2. Intra prediction modes for ALWIP-coded blocks may be signalled after the information related to one or multiple intra-related coding tools instead of being the first one.
   a. In one example, the intra-related coding tools may include QR-BDPCM/PCM/MRL/ISP/wide angle intra prediction/conventional intra coding methods.
3. It is proposed that ALWIP could only be applied to blocks coded with a candidate from the MPM list; or one candidate mapped or converted from a candidate included in the MPM list.
   a. Alternatively, furthermore, the signalling of MPM flag and/or the signalling of remaining coding modes may be skipped for an ALWIP coded block.
4. It is proposed that signalling of intra prediction modes for ALWIP-coded blocks is aligned with that for coding other intra-coded blocks using the conventional intra prediction method/wide angle intra prediction/MRL/or ISP.
   a. In one example, signalling of intra prediction modes for ALWIP-coded blocks may include the following parts:
      i. Whether it is one of MPM candidates may be firstly coded (denoted by a syntax element A).
      ii. If it is an MPM candidate, the following may be further coded in order:
         1) whether it is the first MPM candidate in the MPM list (denoted by a syntax element B)
         2) an MPM index in the remaining MPM list (denoted by a syntax element C)
      iii. If it is not an MPM candidate, the intra mode index in the remaining allowed intra modes (denoted by a syntax element D) may be further coded.
   b. Alternatively, signalling of intra prediction modes for ALWIP-coded blocks may include the following parts:
      i. Whether it is one of MPM candidates may be firstly coded (denoted by a syntax element A).
      ii. If it is an MPM candidate, the following may be further coded in order:
         1) whether it is not a planar mode (denoted by a syntax element B)
         2) an MPM index in the remaining MPM list (denoted by a syntax element C)
      iii. If it is not an MPM candidate, the intra mode index in the remaining allowed intra modes (denoted by a syntax element D) may be further coded.
   c. For a certain syntax element, e.g., syntax element A/B/C/D mentioned above, it may be conditionally signalled.
      i. In one example, when only MPMs are allowed for ALWIP, the signalling of syntax element A may be skipped when ALWIP is used.
      ii. Alternatively, furthermore, syntax element A (e.g., intra_luma_mpm_flag) may be conditionally signalled. For example, the signalling of syntax element A (e.g., intra_luma_mpm_flag) may be under the conditions of intra_luma_ref_idx[x0][y0]==0 && intra_subpartitions_mode_flag[x0][y0]==0 && intra_lwip_flag[x0][y0]==0.
   d. The allowed value range of above syntax elements may depend on the intra coding method and/or block dimension.
      i. In one example, the syntax element C (e.g., intra_luma_mpm_idx) may be [0, 1] for ALWIP, and [0,4] for others.
      ii. In one example, the syntax element D (e.g., intra_luma_mpm_remainder) may be in the range [0, 60] for non-ALWIP; and [0, 31] for 4×4 ALWIP blocks, [0, 15] for W<=8 && H<=8 ALWIP blocks, and [0, 7] for other ALWIP blocks wherein W and H represent the block width and height, respectively.
   e. The syntax element A/B/C/D may be context coded or bypass coded in the arithmetic coding.
      i. Alternatively, furthermore, the context may be selected according to the intra coding method, such as ALWIP/MRL/ISP/wide angle intra prediction.
         1) In one example, when coding the first bin of the binarized MPM index (e.g., intra_luma_not_planar_flag), two contexts may be utilized, with one for conventional intra and ALWIP; the other for ISP; or one for ISP or ALWIP, and the other for the remaining methods.
         2) In one example, when coding the first bin of the binarized MPM index (e.g., intra_luma_not_planar_flag), three contexts may be utilized, with one for ALWIP, one for ISP and one for others.

Regarding Intra Mode Coding for Non-ALWIP Methods:
5. It is proposed that context/allowed range of syntax elements used for coding non-ALWIP-coded intra prediction modes, such as using the conventional intra prediction method/wide angle intra prediction/MRL/or ISP may depend on the intra prediction methods.
   a. In one example, different intra prediction methods may have different size of MPM list.
   b. In one example, different intra prediction methods may have different number of non-MPM candidates.

Figure 23:
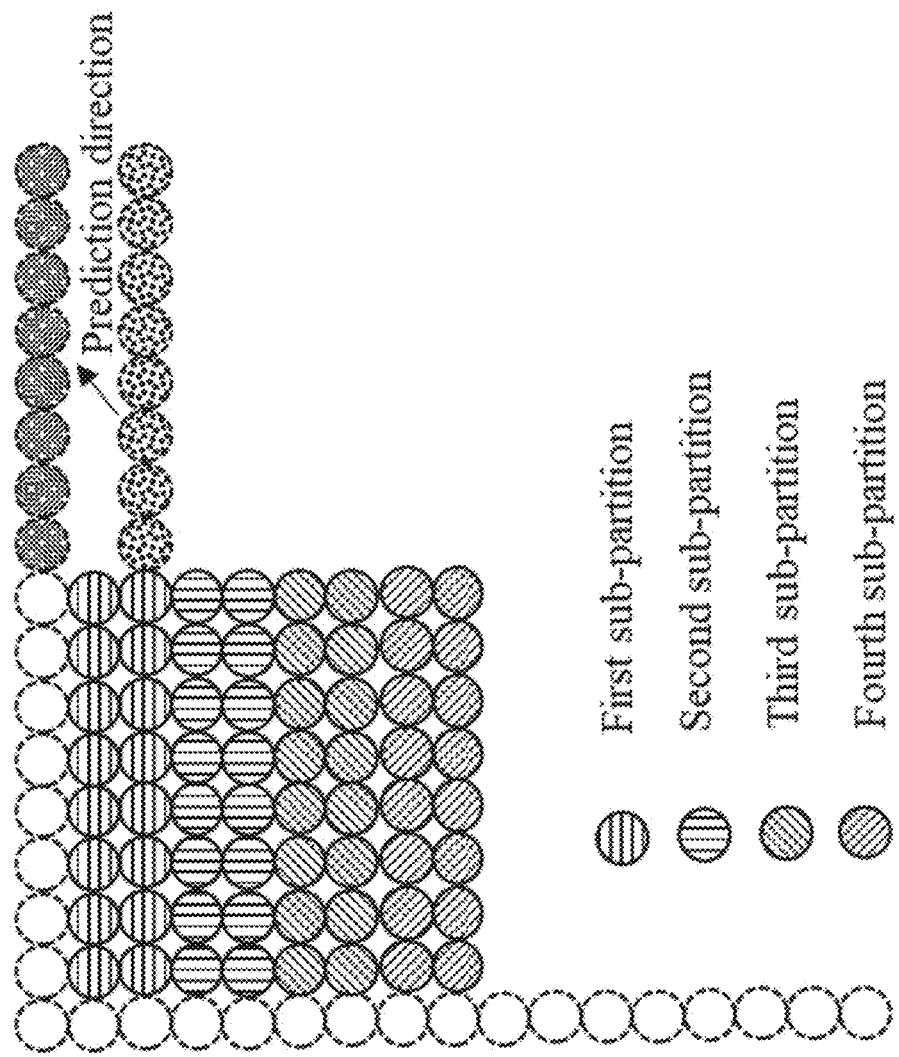
FIG. 23 shows an example of using reference samples of the block to predict reference samples of the inner sub-partitions.

Regarding ISP
6. It is proposed that only two intra prediction modes are allowed for ISP-coded blocks.
   a. In one example, the first two modes in the MPM lists are allowed.
   b. In one example, one of the allowed two modes is the Planar mode, and the other one is one from the MPM list, such as the $1^{st}$ or $2^{nd}$ or the first which is not Planar mode in the MPM list.
   c. Alternatively, furthermore, the signalling of MPM index (e.g., intra_luma_mpm_idx) is skipped for ISP-coded blocks.
   d. In one example, the above methods may be also applicable to other intra coding methods, e.g., MRL, ALWIP.
7. It is proposed that reference samples (or neighbouring samples) of an ISP coded block and/or neighbouring samples of previously coded sub-partitions may be used to predict the current sub-partition of the block.
   a. In one example, if the ISP coded block is split in horizontal direction, above-right reference samples of the block may be used to predict the inner sub-partitions.
   b. In one example, if the ISP coded block is split in vertical direction, below-left reference samples of the block may be used to predict the inner sub-partitions.
   c. In one example, above-right or/and below-left reference samples of the ISP coded block may be used as the above-right or/and below-left reference samples of the inner sub-partitions directly. An example is illustrated in DCError! Reference source not found.

d. In one example, above-right or/and below-left reference samples of the inner sub-partitions may be predicted using above-right or/and below-left reference samples of the ISP coded block. An example is illustrated in FIG. 23.
   i. In one example, the intra prediction method may be used to predict the reference samples of the inner sub-partitions.
   ii. In one example, when a reference sample of the inner sub-partitions is projected to a fractional position of the reference samples of the block, bilinear interpolation may be used for interpolation.
   iii. In one example, when a reference sample of the inner sub-partitions is projected to a fractional position of the reference samples of the block, the fractional position may be rounded to an integer position. E.g., the closest integer position or the closest available integer position.

e. In one example, above-right or/and below-left reference samples of the inner sub-partitions may be filtered after they are generated with above methods but before being used to predict the inner sub-partition.

8. Which neighbouring blocks to be checked in the MPM list construction process may be changed from one video unit to another one. For example, the video unit may be a Cu.
   a. Child nodes in the same parent node may be disallowed to be accessed in the MPM list construction process.
   b. In one example, it may depend on the splitting direction/partition tree type of the parent node.
      i. In one example, if the current block (e.g., the bottom a child node) is split from a horizontal BT and/or TT, and is not the first child node in the split, the above block to be checked may be replaced by above-right or any block in a different parent node.
         1) Alternatively, the intra prediction mode of the above block may be replaced by a converted one. For example, it may be replaced by X+off or (X+off) % T, where X is the intra prediction mode of the above block, and off and T are integers.
      ii. In one example, if the current block (e.g., the right child node) is split from a vertical BT and/or TT, and is not the first child node in the split, the left block to be checked may be replaced by top-left or any block in a different parent node.
         1) Alternatively, the intra prediction mode of the left block may be replaced by a converted one. For example, it may be replaced by X+off or (X+off) % T, where X is the intra prediction mode of the above block, and off and T are integers.
   c. Alternatively, the MPM list may be constructed in the same way, but the intra prediction mode of the other child nodes in the same parent node may be excluded from the MPM list.
   d. Alternatively, the intra prediction mode of the other child nodes in the same parent node may be replaced by other modes. How to signal the intra prediction modes may depend on the partition type.
      i. In one example, if one parent node is split with horizontal/vertical BT and/or TT, the first child node is coded with the planar mode and the second child node is intra coded, then the signalling of intra_luma_not_planar_flag for the 2nd child node may be skipped and inferred to be 1.

9. It is proposed that horizontal and/or vertical BT and/or TT for certain block dimension (such as 4×8, 8×4) may be disabled when ISP is enabled for a slice.
   a. It is proposed that ISP may be disabled when horizontal and/or vertical BT and/or TT for certain block dimension (such as 4×8, 8×4) is enabled for a slice.
      i. When ISP is disabled, the related signalling of ISP side information is skipped.
   b. Alternatively, furthermore, the above methods may be applied when dual tree is enabled.
   c. Alternatively, furthermore, the above methods may be applied when single tree is enabled.

4.1 Example Embodiments

Example changes are shown below. The underlined and bolded sections indicate additions to the working draft, while the strikethrough sections indicate proposed deletions.

|  | Descriptor |
|---|---|
| coding_unit( x0, y0, cbWidth, cbHeight, treeType ) { | |
|   if( tile_group_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && tile_group_type != I ) | |
|       pred_mode_flag | ae(v) |
|     if( ( ( tile_group_type = = I && cu_skip_flag[ x0 ][ y0 ] = =0 ) \|\| | |
|       ( tile_group_type != I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |

| | Descriptor |
|---|---|
|     pcm_alignment_zero_bit | f(1) |
|     pcm_sample( cbWidth, cbHeight, treeType) | |
|   } else { | |
|     if( treeType = = SINGLE_TREE \| \| treeType = = DUAL_TREE_LUMA ) { | |
|       if( abs( Log2( cbWidth ) − Log2( cbHeight ) ) <= 2 ) | |
|         intra_lwip_flag[ x0 ][ y0 ] | ae(v) |
|       [[if( intra_lwip_flag[ x0 ][ y0 ] ) { | |
|         intra_lwip_mpm_flag[ x0 ][ y0 ] | ae(v) |
|         if( intra_lwip_mpm_flag[ x0 ][ y0 ] ) | |
|           intra_lwip_mpm_idx[ x0 ][ y0 ] | ae(v) |
|         Else | |
|           intra_lwip_mpm_remainder[ x0 ][ y0 ] | ae(v) |
|       } else {]] | |
|       if( intra_lwip_flag[ x0 ][ y0 ]==0 && ( y0 % CtbSizeY ) > 0 ) | |
|         intra_luma_ref_idx[ x0 ][ y0 ] | ae(v) |
|       if (intra_lwip_flag[ x0 ][ y0 ]==0 && intra_luma_ref_idx[ x0 ][ y0 ] = = 0 && | |
|         ( cbWidth <= MaxTbSizeY \| \| cbHeight <= MaxTbSizeY ) && | |
|         ( cbWidth * cbHeight > MinTbSizeY * MinTbSizeY )) | |
|         intra_subpartitions_mode_flag[ x0 ][ y0 ] | ae(v) |
|       if( intra_subpartitions_mode_flag[ x0 ][ y0 ] = = 1 && | |
|         cbWidth <= MaxTbSizeY && cbHeight <= MaxTbSizeY ) | |
|         intra_subpartitions_split_flag[ x0 ][ y0 ] | ae(v) |
|       if( intra_luma_ref_idx[ x0 ][ y0 ] = = 0 && | |
|         intra_subpartitions_mode_flag[ x0 ][ y0 ] = = 0 ) | |
|         intra_luma_mpm_flag[ x0 ][ y0 ] | ae(v) |
|       if( intra_luma_mpm_flag[ x0 ][ y0 ] ) { | |
|         if( intra_luma_ref_idx[ x0 ][ y0 ] = = 0 ) | |
|           intra_luma_not_planar_flag[ x0 ][ y0 ] | ae(v) |
|         if( intra_luma_not_planar_flag[ x0 ][ y0 ] ) | |
|           intra_luma_mpm_idx[ x0 ][ y0 ] | ae(v) |
|       } else | |
|         intra_luma_mpm_remainder[ x0 ][ y0 ] | ae(v) |
|       } | |
|       if( treeType = = SINGLE_TREE \| \| treeType = = DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER or MODE_IBC */ | |
|     ... | |
|   } | |
|   if( !pcm_flag[ x0 ][ y0 ] ) { | |
|     if( CuPredMode[ x0 ][ y0 ] != MODE_INTRA && merge_flag[ x0 ][ y0 ] = = 0 ) | |
|       cu_cbf | ae(v) |
|     if( cu_cbf ) { | |
|       if( CuPredMode[ x0 ][ y0 ] = = MODE_INTER && sps_sbt_enabled_flag && !ciip_flag[ x0 ][ y0 ] ) { | |
|         if( cbWidth <= MaxSbtSize && cbHeight <= MaxSbtSize ) { | |
|           allowSbtVerH = cbWidth >= 8 | |
|           allowSbtVerQ = cbWidth >=16 | |
|           allowSbtHorH = cbHeight >= 8 | |
|           allowSbtHorQ = cbHeight >=16 | |
|           if( allowSbtVerH \| \| allowSbtHorH \| \| allowSbtVerQ \| \| allowSbtHorQ ) | |
|             cu_sbt_flag | ae(v) |
|         } | |
|         if( cu_sbt_flag ) { | |
|           if( ( allowSbtVerH \| \| allowSbtHorH ) && ( allowSbtVerQ \| \| allowSbtHorQ) ) | |
|             cu_sbt_quad_flag | ae(v) |
|           if( ( cu_sbt_quad_flag && allowSbtVerQ && allowSbtHorQ ) \| \| ( !cu_sbt_quad_flag && allowSbtVerH && allowSbtHorH ) ) | |
|             cu_sbt_horizontal_flag | ae(v) |
|           cu_sbt_pos_flag | ae(v) |
|         } | |
|       } | |

| Descriptor |
|---|
|     transform_tree( x0, y0, cbWidth, cbHeight, treeType )<br>   }<br>  }<br>} |

The syntax elements intra_luma_mpm_flag[x0][y0], intra_luma_not_planar_flag[x0][y0], intra_luma_mpm_idx [x0][y0] and intra_luma_mpm_remainder[x0][y0] specify the intra prediction mode for luma samples. The array indices x0, y0 specify the location (x0, y0) of the top-left luma sample of the considered coding block relative to the top-left luma sample of the picture. When intra_luma_mpm_flag[x0][y0] is equal to 1, the intra prediction mode is inferred from a neighbouring intra-predicted coding unit according to clause 8.4.2 when intra_lwip_flag[x0][y0] is equal to 0; and the intra prediction mode is inferred from a neighbouring intra-predicted coding unit according to clause 8.4.2 when intra_lwip_flag[x0][y0] is equal to 1. When intra_luma_mpm_flag[x0][y0] is not present, it is inferred to be equal to 1. When intra_luma_not_planar_flag[x0][y0] is not present, it is inferred to be equal to 1.

8.4.2 Derivation Process for Luma Intra Prediction Mode
Input to this process are:
    a luma location (xCb, yCb) specifying the top-left sample of the current luma coding block relative to the top-left luma sample of the current picture,
    a variable cbWidth specifying the width of the current coding block in luma samples,
    a variable cbHeight specifying the height of the current coding block in luma samples.
In this process, the luma intra prediction mode IntraPredModeY[xCb][yCb] is derived.

Table 8-1 specifies the value for the intra prediction mode IntraPredModeY[xCb][yCb] and the associated names.

TABLE 8-1

Specification of intra prediction mode and associated names

| Intra prediction mode | Associated name |
|---|---|
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

NOTE -:
The intra prediction modes INTRA_LT_CCLM, INTRA_L_CCLM and INTRA_T_CCLM are only applicable to chroma components.

IntraPredModeY[xCb][yCb] is derived as follows:
  If intra_luma_not_planar_flag[xCb][yCb] is equal to 1, the following ordered steps:
    1. The neighbouring locations (xNbA, yNbA) and (xNbB, yNbB) are set equal to (xCb−1, yCb+cbHeight−1) and (xCb+cbWidth−1, yCb−1), respectively.
  Otherwise (intra_luma_not_planar_flag[xCb][yCb] is equal to 0), IntraPredModeY[xCb][yCb] is set equal to INTRA_PLANAR.
The variable IntraPredModeY[x][y] with x=xCb . . . xCb+cbWidth−1 and y=yCb . . . yCb+cbHeight−1 is set to be equal to IntraPredModeY[xCb][yCb].

8.4.X Derivation Process for Affine Linear Weighted Intra Prediction Mode

Input to this process are:
    a luma location (xCb, yCb) specifying the top-left sample of the current luma coding block relative to the top-left luma sample of the current picture,
    a variable cbWidth specifying the width of the current coding block in luma samples,
    a variable cbHeight specifying the height of the current coding block in luma samples.
In this process, the affine linear weighted intra prediction mode IntraPredModeY[xCb][yCb] is derived.
IntraPredModeY[xCb][yCb] is derived by the following ordered steps:
  1. The neighbouring locations (xNbA, yNbA) and (xNbB, yNbB) are set equal to (xCb−1, yCb) and (xCb, yCb−1), respectively.
  2. For X being replaced by either A or B, the variables candLwipModeX are derived as follows:
    . . .
  3. The candLwipModeList[x] with x=0 . . . 2 is derived as follows, using lwipMpmCand[sizeId] as specified in Table 8-X2:
  4. IntraPredModeY[xCb][yCb] is derived by applying the following procedure:
    If intra_lwip_mpm_flag[xCb][yCb] is equal to 1, the IntraPredModeY[xCb][yCb] is set equal to candLwipModeList[intra_luma_not_planar_flag[x0][y0]==0?0: (intra_luma_mpm_idx+1) [[intra_lwip_mpm_idx[xCb][yCb]]]].
    Otherwise, IntraPredModeY[xCb][yCb] is derived by applying the following ordered steps:
      1. When candLwipModeList[i] is greater than candLwipModeList[j] for i=0 . . . 1 and for each i, j=(i+1) . . . 2, both values are swapped as follows:

(candLwipModeList[*i*],candLwipModeList[*j*])=Swap (candLwipModeList[*i*],candLwipModeList[*j*])    (8-X14)

2. IntraPredModeY[xCb][yCb] is derived by the following ordered steps:
        i. IntraPredModeY[xCb][yCb] is set equal to intra_lwip_mpm_remainder[xCb][yCb].
        ii. For i equal to 0 to 2, inclusive, when IntraPredModeY[xCb][yCb] is greater than or equal to candLwipModeList[i], the value of IntraPredModeY[xCb][yCb] is incremented by one.

The variable IntraPredModeY[x][y] with x=xCb ... xCb+cbWidth−1 and y=yCb ... yCb+cbHeight−1 is set to be equal to IntraPredModeY[xCb][yCb].

a set of neighbouring blocks of the current block. The multiple blocks are generated by partitioning a video unit using a partition pattern. The set of neighbouring blocks is

TABLE 9-9

Syntax elements and associated binarizations

| Syntax structure | Syntax element | Process | Binarization Input parameters |
|---|---|---|---|
| tile_group_data( ) | end_of_tile_one_bit | FL | cMax = 1 |
| coding_unit( ) | cu_skip_flag[ ][ ] | FL | cMax = 1 |
| | pred_mode_ibc_flag | FL | cMax = 1 |
| | pred_mode_flag | FL | cMax = 1 |
| | intra_lwip_flag[ ][ ] | FL | cMax = 1 |
| | [[intra_lwip_mpm_flag[ ][ ] | FL | cMax = 1 |
| | intra_lwip_mpm_idx[ ][ ] | TR | cMax = 2, cRiceParam = 0 |
| | intra_lwip_mpm_remainder[ ][ ] | FL | cMax = (cbWidth = = 4 && cbHeight = = 4) ? 31 : ( (cbWidth <= 8 && cbHeight <= 8) ? 15 : 7)]] |
| | pcm_flag[ ][ ] | FL | cMax = 1 |
| | intra_luma_ref_idx[ ][ ] | TR | cMax = 2, cRiceParam = 0 |
| | intra_subpartitions_mode_flag | FL | cMax = 1 |
| | intra_subpartition_split_flag | FL | cMax = 1 |
| | intra_luma_mpm_flag [ ][ ] | FL | cMax = 1 |
| | intra_luma_mpm_idx[ ][ ] | TR | cMax = (intra_lwip_flag[ x0 ][ y0 ] ? 2: 5 ), cRiceParam = 0 |
| | intra_luma_mpm_remainder[ ][ ] | TB | cMax = intra_lwip_flag[ x0 ][ y0 ] ? (cbWidth = = 4 && cbHeight = = 4) ? 31 : ( (cbWidth <= 8 && cbHeight <= 8) ? 15 : 7) : [[cMax =]] 60 |

Figure 19:
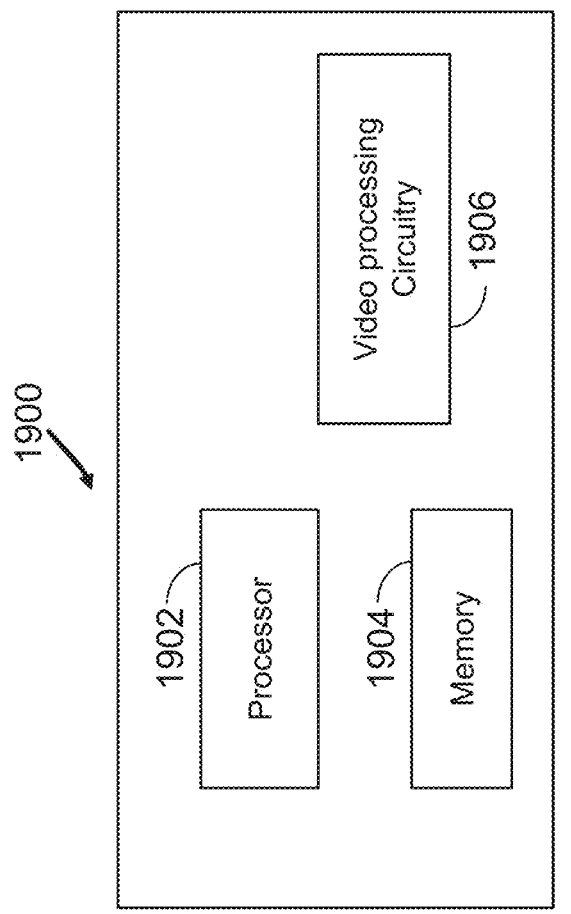
FIG. 19 is a block diagram of an example hardware platform for implementing various embodiments of the present disclosure.

FIG. 19 is a block diagram of a video processing apparatus 1900. The apparatus 1900 may be used to implement one or more of the methods described herein. The apparatus 1900 may be embodied in a smartphone, tablet, computer, Internet of Things (IoT) receiver, and so on. The apparatus 1900 may include one or more processors 1902, one or more memories 1904 and video processing hardware 1606. The processor(s) 1902 may be configured to implement one or more methods described in the present document. The memory (memories) 1904 may be used for storing data and code used for implementing the methods and techniques described herein. The video processing hardware 1606 may be used to implement, in hardware circuitry, some techniques described in the present document.

Figure 20:
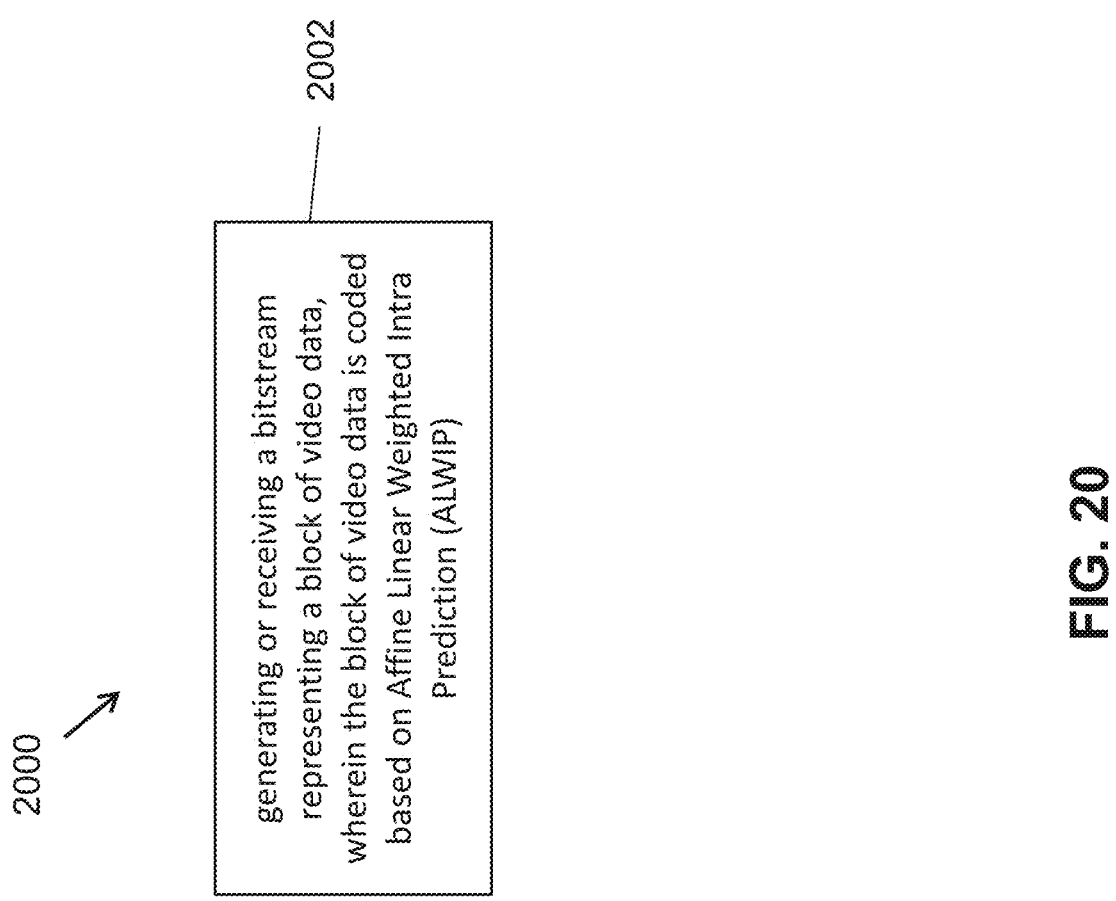
FIG. 20 is a flowchart for a method of video processing according to various embodiments of the present disclosure.

FIG. 20 is a flowchart for a method 2000 of video processing in accordance with one or more examples of the present technology. The method 2000 includes, at operation 2002, generating or receiving a bitstream representing a block of video data. The block of video data is coded based on Affine Linear Weighted Intra Prediction (ALWIP). Side information of the ALWIP and side information of Quantized Residual Block Differential Pulse Code Modulation (QR-BDPCM) are coded sequentially in a first order in the bitstream.

Figure 21:
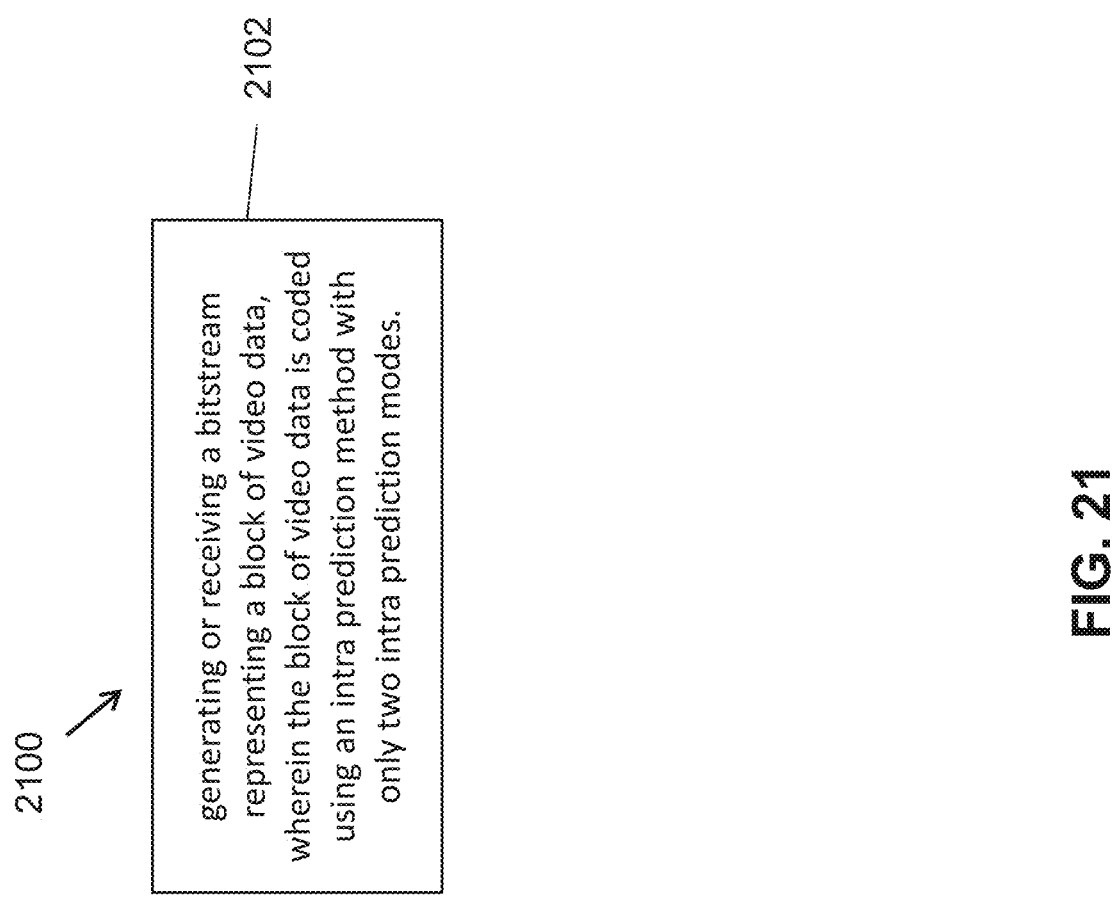
FIG. 21 is another flowchart for a method of video processing according to various embodiments of the present disclosure.
Figure 22:
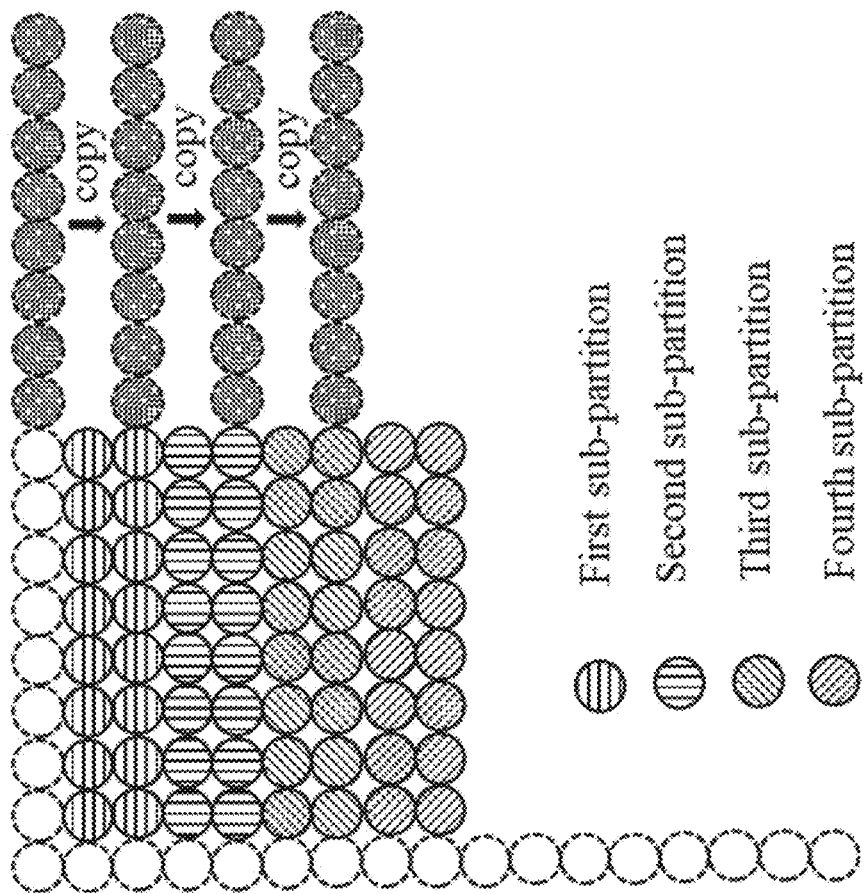
FIG. 22 shows an example of copying reference samples of the block to reference samples of inner sub-partitions.

FIG. 21 is a flowchart for a method 2100 of video processing in accordance with one or more examples of the present technology. The method 2100 includes, at operation 2102, generating or receiving a bitstream representing a block of video data, wherein the block of video data is coded using an intra prediction method with only two intra prediction modes.

Figure 24:
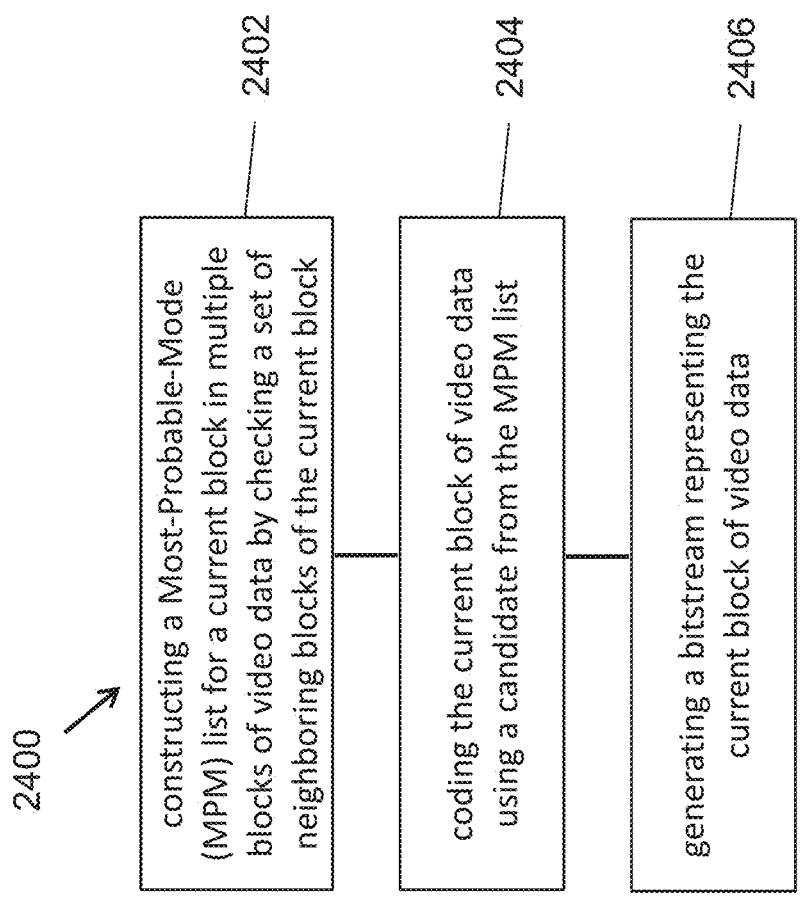
FIG. 24 is another flowchart for a method of video processing according to various embodiments of the present disclosure.

FIG. 24 is a flowchart for a method 2400 of video processing in accordance with one or more examples of the present technology. The method 2400 includes, at operation 2402, constructing a Most-Probable-Mode (MPM) list for a current block in multiple blocks of video data by checking determined based on the partition pattern. The method 2400 includes, at operation 2404, coding the current block of video data using a candidate from the MPM list. The method 2400 also includes, at operation 2406, generating or receiving a bitstream representing the current block of video data.

Figure 25:
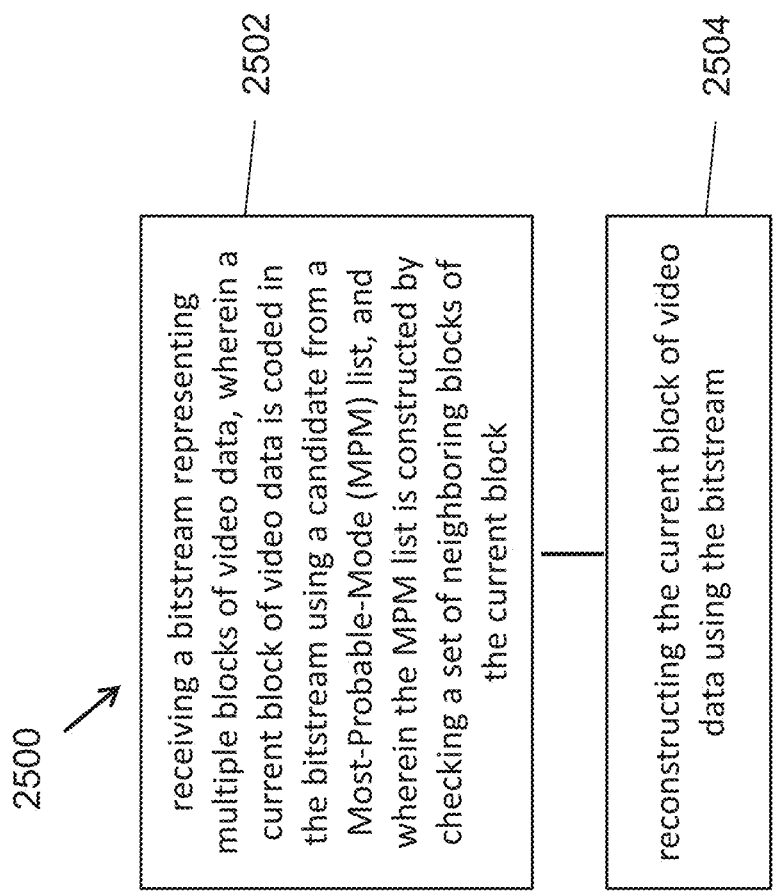
FIG. 25 is another flowchart for a method of video processing according to various embodiments of the present disclosure.

FIG. 25 is a flowchart for a method 2500 of video processing in accordance with one or more examples of the present technology. The method 2500 includes, at operation 2502, receiving a bitstream representing multiple blocks of video data. A current block of video data is coded in the bitstream using a candidate from a Most-Probable-Mode (MPM) list, and the MPM list is constructed by checking a set of neighbouring blocks of the current block. The multiple blocks are generated by partitioning a video unit using a partition pattern, and the set of neighbouring blocks is determined based on the partition pattern. The method 2500 also includes, at operation 2504, reconstructing the current block of video data using the bitstream.

Additional embodiments and techniques are described in the following examples.

1. A video processing method, comprising: generating or receiving a bitstream representing a block of video data, wherein the block of video data is coded based on Affine Linear Weighted Intra Prediction (ALWIP), and wherein side information of the ALWIP and side information of Quantized Residual Block Differential Pulse Code Modulation (QR-BDPCM) are coded sequentially in a first order in the bitstream.

2. The method of example 1, wherein the first order indicates that the side information of ALWIP is coded after the side information of QR-BDPCM.

3. The method of example 2, wherein the side information of ALWIP is coded based on a usage of QR-BDPCM in processing the block of video data.

4. The method of example 1, where the first order indicates that the side information of QR-BDPCM is coded after the side information of ALWIP.

5. The method of example 4, wherein the side information of QR-BDPCM is coded based on a usage of ALWIP in processing the block of video data.

6. The method of any of examples 1 to 5, wherein the QR-BDPCM is applied in signalling a residual value of the block of video data.

Further embodiments of examples 1-6 are described in item 1 in Section 4.

7. The method of any of example 1 to 6, wherein an intra prediction mode of the block of video data is coded after information about one or more prediction methods in the bitstream.

8. The method of example 7, wherein the one or more coding methods includes at least one of QR-BDPCM, Multiple Reference Line (MRL) intra prediction, Intra Subblock Partitioning (ISP), or wide angle intra prediction.

Further embodiments of examples 7-8 are described in item 2 in Section 4.

9. The method of any of examples 1 to 8, wherein the block of video data is coded based on a candidate from a Most-Probable-Mode (MPM) list.

10. The method of example 9, wherein the bitstream includes at least one of a first syntax element indicating whether the candidate from the MPM list is coded first, a second syntax element indicating whether the candidate is a first candidate in the MPM list or whether the candidate is in a planar mode, a third syntax element indicating an MPM index of a remaining candidate in the MPM list, or a fourth syntax element indicating an intra prediction mode index in a list of allowed intra prediction modes.

11. The method of example 10, wherein a value range of the first, second, third, or fourth syntax element is determined based on an intra prediction method or a block dimension.

Further embodiments of examples 9-11 are described in items 3-4 in Section 4.

12. A video processing method, comprising: generating or receiving a bitstream representing a block of video data, wherein the block of video data is coded using an intra prediction method with only two intra prediction modes.

13. The method of example 12, wherein the two intra prediction modes are determined based on first two modes a Most-Probable-Mode (MPM) list.

14. The method of example 12, wherein the intra prediction method includes at least one of Multiple Reference Line (MRL) intra prediction, Affine Linear Weighted Intra Prediction (ALWIP), Intra Subblock Partitioning (ISP), or wide angle intra prediction.

Further embodiments of examples 12-13 are described in item 6 in Section 4.

15. The method of example 12, wherein the intra prediction method is Intra Subblock Partitioning (ISP) and wherein reference samples of the block of video data are used to predict a current sub-partition of the block.

16. The method of example 15, wherein the current sub-partition is obtained by partitioning the block in a horizontal direction, and wherein the reference samples include above-right reference samples of the block.

17. The method of example 15, wherein the current sub-partition is obtained by partitioning the block in a vertical direction, and wherein the reference samples include below-left reference samples of the block.

18. The method of any of examples 15 to 17, wherein reference samples of the block are used as reference samples of the current sub-partition.

19. The method of any of examples 15 to 17, wherein reference samples of the current sub-partition are determined based on a fractional position of the reference samples of the block.

Further embodiments of examples 14-19 are described in item 7 in Section 4.

20. A video processing method, comprising: constructing a Most-Probable-Mode (MPM) list for a current block in multiple blocks of video data by checking a set of neighbouring blocks of the current block, wherein the multiple blocks are generated by partitioning a video unit using a partition pattern, and wherein the set of neighbouring blocks is determined based on the partition pattern; coding the current block of video data using a candidate from the MPM list; and generating a bitstream representing the current block of video data.

21. A video processing method, comprising: receiving a bitstream representing multiple blocks of video data, wherein a current block of video data is coded in the bitstream using a candidate from a Most-Probable-Mode (MPM) list, wherein the MPM list is constructed by checking a set of neighbouring blocks of the current block, wherein the multiple blocks are generated by partitioning a video unit using a partition pattern, and wherein the set of neighbouring blocks is determined based on the partition pattern; and reconstructing the current block of video data using the bitstream.

22. The method of example 20 or 21, wherein the set of neighbouring blocks has a different parent block than the current block.

23. The method of example 20 or 21, wherein the partition pattern includes at least one of a vertical binary splitting pattern, a horizontal binary splitting pattern, a vertical ternary splitting pattern, or a horizontal ternary splitting pattern.

Further embodiments of examples 20-23 are described in item 8 in Section 4.

24. A video processing apparatus comprising a processor configured to implement one or more of examples 1 to 23.

25. A computer-readable medium having code stored thereon, the code, when executed by a processor, causing the processor to implement a method recited in any one or more of examples 1 to 23.

Figure 26:
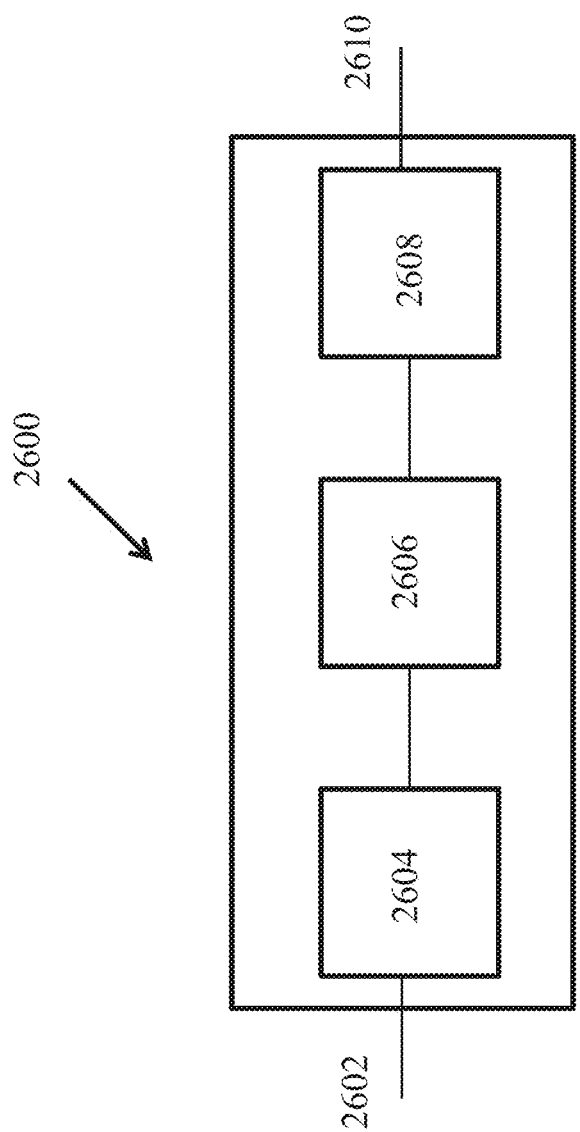
FIG. 26 is a block diagram of an example video processing system in which various embodiments of the present disclosure may be implemented.

FIG. 26 is a block diagram showing an example video processing system 2600 in which various techniques disclosed herein may be implemented. Various implementations may include some or all of the components of the system 2600. The system 2600 may include input 2602 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2600 may include a coding component 2604 that may implement the various coding or encoding methods described in the present document. The coding component 2604 may reduce the average bitrate of video from the input 2602 to the output of the coding component 2604 to produce a coded representation of the video. The coding techniques are therefore sometimes called video compression or video transcoding techniques. The output of the coding component 2604 may be either stored, or transmitted via a communication connected, as represented by the component 2606. The stored or communicated bitstream (or coded) representation of the video received at the input 2602 may be used by the component 2608 for generating pixel values or displayable video that is sent to a display interface 2610. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 27:
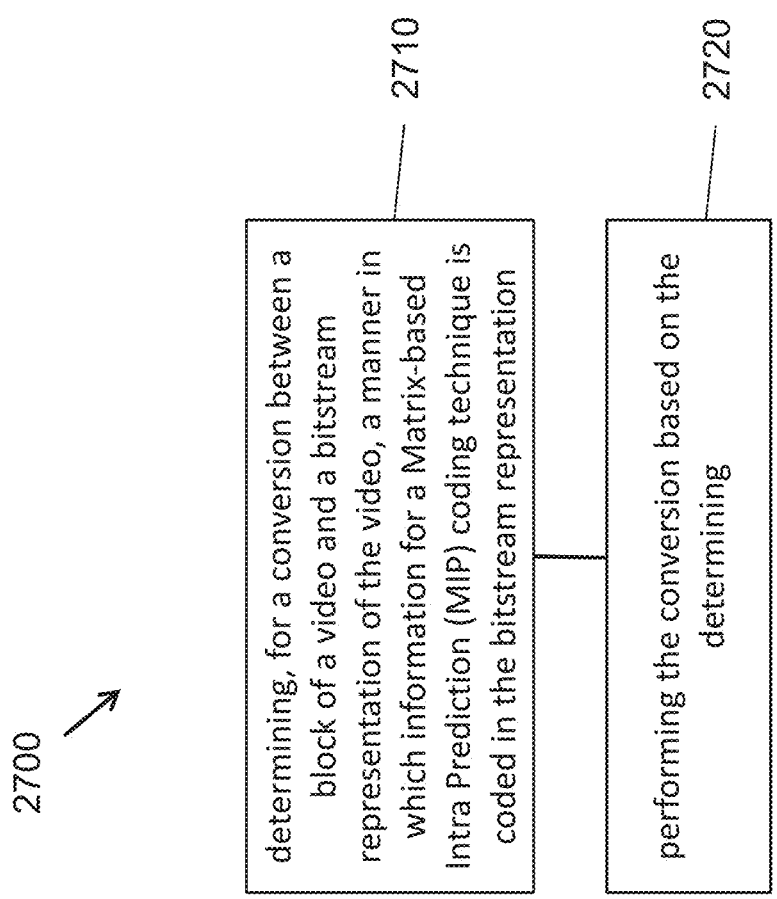
FIG. 27 is a flowchart representation of a method for video processing according to various embodiments of the present disclosure.

FIG. 27 is a flowchart representation of a method 2700 for video processing in accordance with the present technology. The method 2700 includes, at operation 2710, determining, for a conversion between a block of a video and a bitstream representation of the video, a manner in which information for a Matrix-based Intra Prediction (MIP) coding technique is coded in the bitstream representation. Using the MIP coding technique, a prediction block of the block is determined using the MIP coding technique based on performing a matrix vector multiplication operation on previously coded samples of the video. The method 2700 also includes, at operation 2720, performing the conversion based on the determining.

In some embodiments, the manner specifies that the information for the MIP coding technique is coded with respect to a Quantized Residual Block Differential Pulse Code Modulation (QR-BDPCM) coding technique in which transform is not applied to prediction errors and prediction is generated using samples within a picture including the block. In some embodiments, only one of the MIP coding technique or the QR-BDPCM coding technique is applicable to the block. In some embodiments, in case the MIP coding technique is applied to the block, side information of the QR-BDPMC coding technique is omitted in the bitstream representation. In some embodiments, in case the QR-BDPCM coding technique is applied to the block, side information of the MIP coding technique is omitted in the bitstream representation.

In some embodiments, both the MIP coding technique and the QR-BDPCM coding technique are applicable to the block. In some embodiments, the conversion comprises using the MIP coding technique in an intra prediction process, and residual information of the block is coded in the bitstream representation according to the QR-BDPCM coding technique.

In some embodiments, the manner specifies that side information for the MIP coding technique is coded after side information for the QR-BDPCM coding technique. In some embodiments, the side information for the MIP coding technique is coded based on usage of the QR-BDPCM coding technique. In some embodiments, the side information for the MIP coding technique is omitted in the bitstream representation in case the QR-BDPCM coding technique is applied to the block. In some embodiments, the side information for the MIP coding technique is present in the bitstream representation in case the QR-BDPCM coding technique is not applied to the block.

In some embodiments, in case the QR-BDPCM coding technique is applied to the block, a first part of the side information for the MIP coding technique is omitted in the bitstream representation and a second part of the side information for the MIP coding technique is coded in the bitstream representation. In some embodiments, the first part comprises one or more prediction modes of the MIP coding technique. In some embodiments, the second part comprises information about usage of the MIP coding technique. In some embodiments, in case the QR-BDPCM coding technique is applied to the block, information about usage of the MIP coding technique is included in the bitstream representation and the MIP coding technique is not applicable to the block.

In some embodiments, the manner specifies that side information for the MIP coding technique is coded before side information for the QR-BDPCM coding technique. In some embodiments, the manner specifies that the side information for the QR-BDPCM coding technique is coded based on usage of the MIP coding technique for the block. In some embodiments, the side information for the QR-BDPCM is omitted in the bitstream representation in case the MIP coding technique is applied to the block. In some embodiments, in case the MIP coding technique is applied to the block and a prediction mode of the MIP coding technique corresponds to a horizontal or a vertical mode, a first part of the side information for the QR-BDPCM coding technique is omitted in the bitstream representation and a second part of the side information for the QR-BDPCM coding technique is coded in the bitstream representation. In some embodiments, the first part of the side information for the QR-BDPCM coding technique comprises a prediction direction of the QR-BDPCM coding technique. In some embodiments, the second part of the side information for the QR-BDPCM coding technique comprises usage of the QR-BDPCM coding technique.

In some embodiments, the side information of the QR-BDPCM coding technique comprises at least one of an indication of usage of the QR-BDPCM coding technique, or a prediction direction. In some embodiments, the side information of the MIP coding technique comprises at least one of an indication of usage of the MIP coding technique, an indication of whether an input vector for luma samples is transposed or not for the MIP coding technique, or an indication of a prediction mode. In some embodiments, in case the MIP coding technique is applied to the block, information about usage of the QR-BDPCM coding technique is included in the bitstream representation and the QR-BDPCM coding technique is not applicable to the block.

In some embodiments, the manner specifies that the information for the MIP coding technique is coded with respect to one or more intra coding techniques. In some embodiments, the manner specifies that, in case the block is coded using the MIP coding technique, an intra prediction mode of the block is coded after information related to the one or more intra coding techniques. In some embodiments, the one or more intra coding techniques comprise at least a QR-BDPCM coding technique, a Pulse-code Modulation (PCM) coding technique, a Multiple Reference Line (MRL) coding technique, an Intra Subblock Partitioning (ISP) coding technique, a wide angle intra prediction coding technique, or a conventional intra coding technique. In some embodiments, the manner specifies that coding of an intra prediction mode of the MIP coding technique for the block is consistent with coding of an intra prediction mode for another block that is coded using the one or more intra coding techniques.

In some embodiments, the coding of an intra prediction mode of the MIP coding technique comprises determining whether the intra prediction mode is one of a list of Most Probable Mode (MPM) candidates. In some embodiments, whether the intra prediction mode is one of the list of Most Probable Mode (MPM) candidates is represented as a first syntax element in the bitstream representation. In some embodiments, the coding of the intra prediction mode of the MIP coding technique further comprises determining, in case the intra prediction mode is one of the list of Most Probable Mode (MPM) candidates, whether the intra prediction mode is a first candidate in the list of MPM candidates. In some embodiments, whether the intra prediction mode is a first candidate in the list of MPM candidates is represented as a second syntax element in the bitstream representation.

In some embodiments, the coding of the intra prediction mode of the MIP coding technique further comprises coding an MPM index of the intra prediction mode as a third syntax element in the bitstream representation in case the intra prediction mode is not the first candidate in the list of MPM candidates. In some embodiments, the coding of the intra prediction mode of the MIP coding technique further comprises determining, in case the intra prediction mode is one of the list of Most Probable Mode (MPM) candidates, whether the intra prediction mode is a planar mode. In some embodiments, whether the intra prediction mode is the planar mode is represented in the bitstream as a fourth syntax element. In some embodiments, the coding of the intra prediction mode of the MIP coding technique further comprises coding an MPM index of the intra prediction mode as a fifth syntax element in the bitstream representation in case the intra prediction mode is not the planar mode. In some embodiments, the coding of the intra prediction mode of the MIP coding technique further comprises coding an intra mode index of the intra prediction mode in a set of allowed intra modes as a sixth syntax element in the bitstream representation in case the intra prediction mode is not one of the list of Most Probable Mode (MPM) candidates.

In some embodiments, the first, the second, the third, the fourth, the fifth, or the sixth syntax element is conditionally coded in the bitstream representation. In some embodiments, the first syntax element is omitted in the bitstream representation in case the MIP coding technique is applied to the block. In some embodiments, the first syntax element is included in the bitstream representation in case intra_luma_ref_idx[x0][y0]==0 and the block is not coded using the ISP coding technique or the MIP coding technique. In some embodiments, a value of the first, the second, the third, the fourth, the fifth, or the sixth element is based on a dimension of the block or a coding technique applicable to the block. In some embodiments, a value of the third or the fifth syntax element is 0 or 1 in case the MIP coding technique is applied to the block, and the value of the third or the fifth syntax element is in a range of [0, 4] inclusive in case another coding technique is applied to the block. In some embodiments, a value of the sixth syntax element is in a range of [0, 60] inclusive in case the MIP coding technique is not applied to the block, the value of the sixth syntax element is in a range of [0, 31] inclusive in case the MIP coding technique is applied to the block, the block having a dimension of 4×4, the value of the sixth syntax element is in a range of [0,15] inclusive in case the MIP coding technique is applied to the block, the block having a width smaller or equal to 8 and a height smaller or equal to 8, and the value of the sixth syntax element is in a range of [0, 8] inclusive in case the MIP coding technique is applied to the block that has a different dimension.

In some embodiments, a context or a value of a syntax element used in an intra coding technique of the one or more intra coding techniques is based on the intra coding technique. In some embodiments, different intra coding techniques use multiple MPM lists of different sizes. In some embodiments, different intra coding techniques use different numbers of MPM candidates. In some embodiments, the first, the second, the third, the fourth, the fifth, or the sixth element is context coded or bypass coded in the bitstream representation.

In some embodiments one or more contexts are selected based on the one or more intra coding techniques. In some embodiments, two contexts are used for coding a syntax element in the bitstream representation. In some embodiments, a first context is used for the conventional intra prediction coding technique and the MIP coding technique, and a second context is used for the ISP coding technique. In some embodiments, a first context is used for the ISP coding technique and the MIP coding technique, and a second context is used for one or more other coding techniques. In some embodiments, three contexts are used for coding a syntax element in the bitstream representation. In some embodiments, a first context is used for the MIP coding technique, a second context is used for the ISP coding techniques, and a third context is used for one or more other coding techniques.

Figure 28:
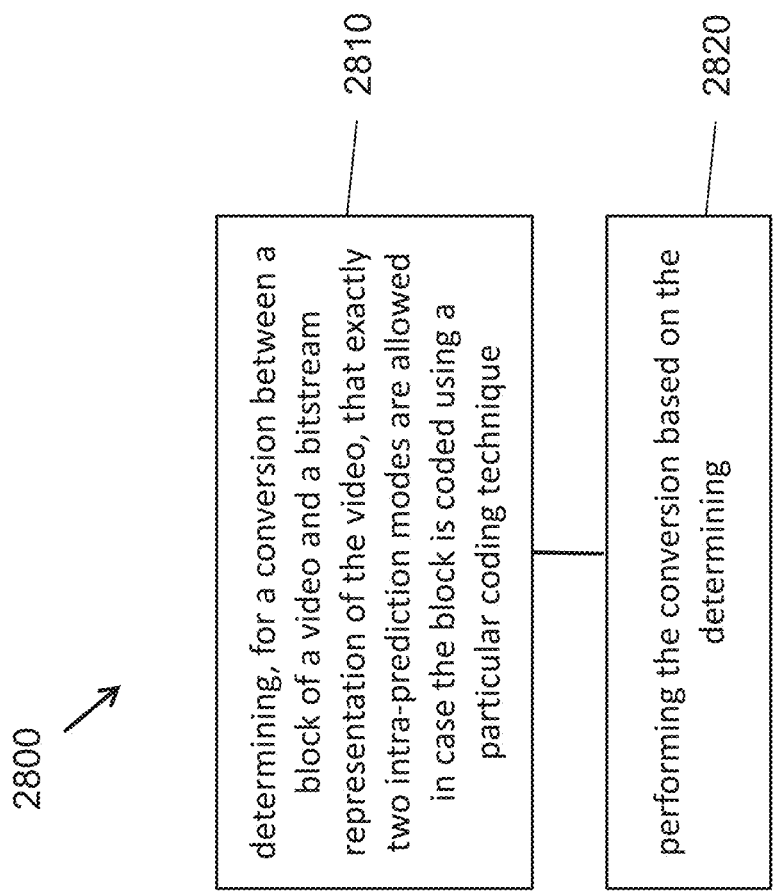
FIG. 28 is a flowchart representation of another method for video processing according to various embodiments of the present disclosure.

FIG. 28 is a flowchart representation of a method 2800 for video processing in accordance with the present technology. The method 2800 includes, at operation 2810, determining, for a conversion between a block of a video and a bitstream representation of the video, that exactly two intra prediction modes are allowed in case the block is coded using a particular coding technique. The method 2800 also includes, at operation 2820, performing the conversion based on the determining.

In some embodiments, the particular coding technique comprises an Intra Subblock Partitioning (ISP) coding technique, a Multiple Reference Line (MRL) coding technique, or a Matrix-based Intra Prediction (MIP) coding technique. In some embodiments, the exactly two intra prediction modes comprise first two modes in a list of Most-Probable-Mode (MPM) candidates. In some embodiments, a first mode of the only two intra prediction modes is a planar mode, and a second mode of the only two intra prediction modes is a mode selected from a list of Most-Probable-Mode (MPM) candidates. In some embodiments, the second mode is a non-planar mode selected from the list of MPM candidates. In some embodiments, an index indicating a prediction mode in the list of MPM candidates is omitted in the bitstream representation in case the block is coded using the ISP coding technique.

Figure 29:
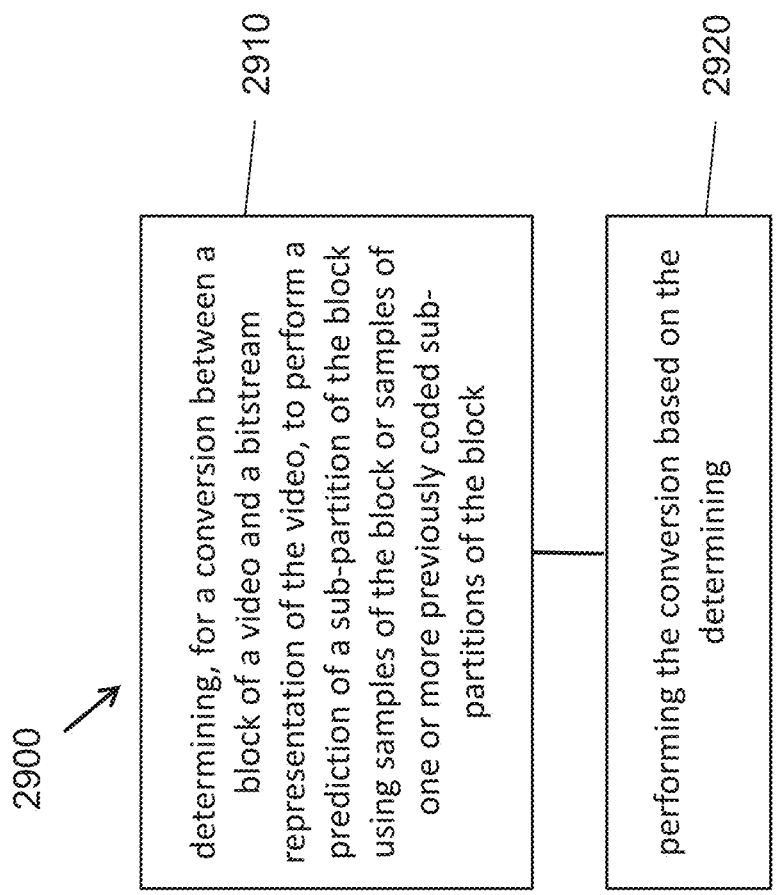
FIG. 29 is a flowchart representation of another method for video processing according to various embodiments of the present disclosure.

FIG. 29 is a flowchart representation of a method 2900 for video processing in accordance with the present technology. The method 2900 includes, at operation 2910, determining, for a conversion between a block of a video and a bitstream representation of the video, to perform a prediction of a sub-partition of the block using samples of the block or samples of one or more previously coded sub-partitions of the block. The block is coded using an Intra Subblock Partitioning (ISP) coding technique in which the block is partitioned into multiple sub-partitions and a prediction of each sub-partition is determined based on a previously reconstructed sub-partition. The multiple sub-partitions include a first sub-partition and one or more inner sub-partitions. The method 2900 also includes, at operation 2920, performing the conversion based on the determining.

In some embodiments, the block is partitioned in a horizontal direction, and an inner sub-partition of the one or more inner sub-partitions is predicted using samples located above and to the right of the inner sub-partition. In some embodiments, the block is partitioned in a vertical direction, and an inner sub-partition of the one or more inner sub-partitions is predicted using samples located below and to the left of the inner sub-partition. In some embodiments, samples of the block are copied to be used as samples for an inner sub-partition. In some embodiments, samples of an inner sub-partition are derived based on samples of the block. In some embodiments, the samples of the inner sub-partition are derived using an intra prediction coding technique. In some embodiments, a bilinear interpolation is applied in case a sample of the inner sub-partition is project to a fractional position of a sample of the block. In some embodiments, in case a sample of an inner sub-partition is projected to a fractional position of a sample of the block, the fractional position is rounded to an integer position that is an available position closest to the fractional position. In some embodiments, the samples located above and to the right of the inner sub-partition or below and to the left of the inner sub-partition are filtered prior to being used for predicting the inner sub-partition.

Figure 30:
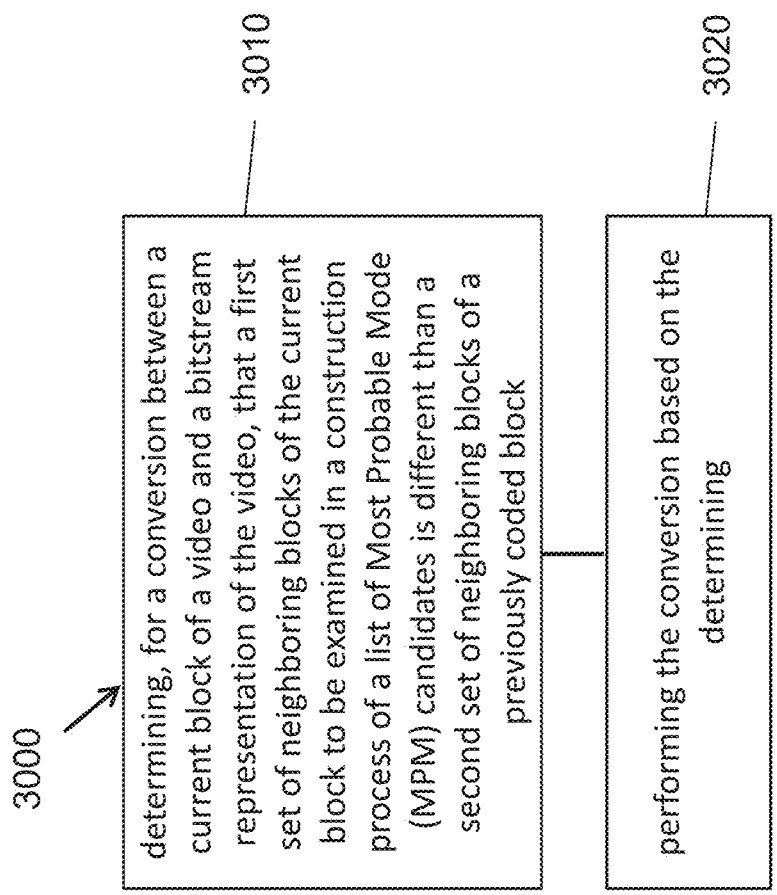
FIG. 30 is a flowchart representation of another method for video processing according to various embodiments of the present disclosure.

FIG. 30 is a flowchart representation of a method 3000 for video processing in accordance with the present technology. The method 3000 includes, at operation 3010, determining, for a conversion between a current block of a video and a bitstream representation of the video, that a first set of neighbouring blocks of the current block to be examined in a construction process of a list of Most Probable Mode (MPM) candidates is different than a second set of neighbouring blocks of a previously coded block. The current block is a child block of a parent block that is partitioned into multiple child blocks. The method 3000 also includes, at operation 3020, performing the conversion based on the determining.

In some embodiments, the current block comprises a coding unit. In some embodiments, the first set of neighbouring blocks is determined based on a manner in which the parent block is partitioned. In some embodiments, the parent block is partitioned horizontally, and, in case the current block is not a first child block of the parent block, a neighbouring block that is a child block of another parent block or is located above and to the right of the current block is examined in the construction process. In some embodiments, the parent block is partitioned horizontally, and, in case the current block is not a first child block of the parent block, an intra prediction mode X of a neighbouring block that is located above the current block is represented as (X+off) or (X+off) % T in the bitstream representation, off and T being integers.

In some embodiments, the parent block is partitioned vertically, and, in case the current block is not a first child block of the parent unit, a neighbouring block that is a child block of another parent block or is located below and to the left of the current block is examined in the construction process. In some embodiments, the parent block is partitioned vertically, and, in case the current block is not a first child block of the parent block, an intra prediction mode X of a neighbouring block that is located to the left of the current block is represented as (X+off) or (X+off) % T in the bitstream representation, off and T being integers.

In some embodiments, the multiple child blocks of the parent block are not accessible in the construction process of the list of MPM candidates. In some embodiments, an intra prediction mode of the multiple child blocks of the parent unit is excluded from the list of MPM candidates. In some embodiments, an intra prediction mode of the multiple child blocks of the parent block is replaced by a different mode.

In some embodiments, signalling of the intra prediction mode of the multiple child blocks of the parent block is based on a manner in which the parent block is partitioned. In some embodiments, the intra prediction mode of a child block that is coded using an intra prediction coding technique is omitted in the bitstream representation, and the intra prediction mode of the child block is considered to be a non-planar mode.

FIG. 31 is a flowchart representation of a method 3100 for video processing in accordance with the present technology. The method 3100 includes, at operation 3110, determining, for a conversion between a video block of a slice of a video and a bitstream representation of the video, a type of partition permitted for the video block based on whether an intra-subblock partitioning tool is enabled for the slice. The method 3100 also includes, at operation 3120, performing the conversion based on the determining.

In some embodiments, the type of partition is based on a dimension of the block, and the type of partition is disabled in case the ISP coding technique is enabled. In some embodiments, the type of partition is based on a dimension of the block, and the ISP technique is disabled in case the type partition is enabled.

In some embodiments, the partition of the block comprises a horizontal or a vertical partition of the block. In some embodiments, the partition of the block comprises a binary or a ternary partition of the block. In some embodiments, the dimension of the block is 4×8 or 8×4. In some embodiments, side information of the ISP coding technique is omitted in the bitstream representation in case the ISP coding technique is disabled. In some embodiments, a dual tree partition is enabled for the block. In some embodiments, a single tree partition is enabled for the block.

In some embodiments, performing the conversion includes generating the bitstream representation based on the block of the video. In some embodiments, performing the conversion includes generating the block of the video from the bitstream representation.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   determining, for a conversion between a block of a video and a bitstream representation of the video, only one of first information related to a first coding mode and second information related to a second coding mode being included in the bitstream, and
   performing the conversion based on the determining,
   wherein in the first coding mode, prediction samples are derived based on performing a matrix vector multiplication operation,
   wherein in the second coding mode, differences between quantized residuals derived with an intra prediction of the block and predictors of the quantized residuals are included in the bitstream,
   wherein in the second coding mode, a transform operation is skipped, and
   wherein coding the first information is based on abs(Log2(cbWidth)−Log2(cbHeight), wherein cbWidth denotes a width of the block, cbHeight denotes a height of the block, and abs is an algorithmic symbol for absolute value.

2. The method of claim 1, wherein in the second coding mode, prediction samples are derived based on a horizontal intra coding mode or a vertical intra coding mode.

3. The method of claim 2, wherein in the second coding mode, differences between the quantized residuals and the predictors of the quantized residuals are represented in the bitstream using a pulse coding modulation representation.

4. The method of claim 1, wherein in response to the second information being included in the bitstream, the first information is excluded from the bitstream.

5. The method of claim 4, wherein the first coding mode is not applied to the block.

6. The method of claim 1, wherein only one of the first coding mode or the second coding mode is applicable to the block.

7. The method of claim 1, wherein the first coding mode includes a plurality of types, and one of the plurality of types is determined to be used without constructing a candidate list.

8. The method of claim 1, wherein in the first coding mode, a boundary down-sampling operation is determined to apply on neighbouring samples of the block based on a size of the block before the matrix vector multiplication operation, and an up-sampling operation is selectively performed after the matrix vector multiplication operation.

9. The method of claim 1, wherein the coding of the first information is based on whether abs(Log2(cbWidth)−Log2(cbHeight) is greater than a fixed value.

10. The method of claim 1, wherein the conversion includes encoding the block into the bitstream.

11. The method of claim 1, wherein the conversion includes decoding the block from the bitstream.

12. An apparatus for processing video data comprising a processor and a non-transitory memory with instructions thereon, wherein the instructions upon execution by the processor, cause the processor to:
   determine, for a conversion between a block of a video and a bitstream representation of the video, only one of first information related to a first coding mode and second information related to a second coding mode being included in the bitstream, and
   perform the conversion based on the determining,
   wherein in the first coding mode, prediction samples are derived based on performing a matrix vector multiplication operation,
   wherein in the second coding mode, differences between quantized residuals derived with an intra prediction of the block and predictors of the quantized residuals are included in the bitstream,
   wherein in the second coding mode, a transform operation is skipped, and
   wherein coding the first information is based on abs(Log2(cbWidth)−Log2(cbHeight), wherein cbWidth denotes a width of the block, cbHeight denotes a height of the block, and abs is an algorithmic symbol for absolute value.

13. The apparatus of claim 12, wherein in the second coding mode, prediction samples are derived based on a horizontal intra coding mode or a vertical intra coding mode, and differences between the quantized residuals and the predictors of the quantized residuals are represented in the bitstream using a pulse coding modulation representation.

14. The apparatus of claim 12, wherein in response to the second information being included in the bitstream, the first information is excluded from the bitstream, and the first coding mode is not applied to the block.

15. The apparatus of claim 12, wherein the first coding mode includes a plurality of types, and one of the plurality of types is determined to be used without constructing a candidate list.

16. A non-transitory computer-readable storage medium storing instructions that cause a processor to:
   determine, for a conversion between a block of a video and a bitstream representation of the video, only one of first information related to a first coding mode and second information related to a second coding mode being included in the bitstream, and
   perform the conversion based on the determining,
   wherein in the first coding mode, prediction samples are derived based on performing a matrix vector multiplication operation,
   wherein in the second coding mode, differences between quantized residuals derived with an intra prediction of the block and predictors of the quantized residuals are included in the bitstream,
   wherein in the second coding mode, a transform operation is skipped, and
   wherein coding the first information is based on abs(Log2(cbWidth)−Log2(cbHeight), wherein cbWidth denotes a width of the block, cbHeight denotes a height of the block, and abs is an algorithmic symbol for absolute value.

17. The non-transitory computer-readable storage medium of claim 16, wherein in the second coding mode, prediction samples are derived based on a horizontal intra coding mode or a vertical intra coding mode, and differences between the quantized residuals and the predictors of the quantized residuals are represented in the bitstream using a pulse coding modulation representation.

18. The non-transitory computer-readable storage medium of claim 16, wherein in response to the second information being included in the bitstream, the first information is excluded from the bitstream, and the first coding mode is not applied to the block.

19. A non-transitory computer-readable recording medium storing a bitstream of a video which is generated by a method performed by a video processing apparatus, wherein the method comprises:
   determining only one of first information related to a first coding mode and second information related to a second coding mode being included in the bitstream, and
   generating the bitstream based on the determining,
   wherein in the first coding mode, prediction samples are derived based on performing a matrix vector multiplication operation,
   wherein in the second coding mode, differences between quantized residuals derived with an intra prediction of the block and predictors of the quantized residuals are included in the bitstream,
   wherein in the second coding mode, a transform operation is skipped, and
   wherein coding the first information is based on abs(Log2(cbWidth)−Log2(cbHeight), wherein cbWidth denotes a width of the block, cbHeight denotes a height of the block, and abs is an algorithmic symbol for absolute value.

20. The non-transitory computer-readable recording medium of claim 19, wherein in the second coding mode, prediction samples are derived based on a horizontal intra coding mode or a vertical intra coding mode, and differences between the quantized residuals and the predictors of the quantized residuals are represented in the bitstream using a pulse coding modulation representation.

\* \* \* \* \*